(12) United States Patent
Naito et al.

(10) Patent No.: US 12,437,186 B2
(45) Date of Patent: Oct. 7, 2025

(54) MENTAL IMAGE VISUALIZATION METHOD, MENTAL IMAGE VISUALIZATION DEVICE AND RECORDING MEDIUM

(71) Applicant: OSAKA UNIVERSITY, Osaka (JP)

(72) Inventors: Tomoyuki Naito, Osaka (JP); Ryota Imai, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 390 days.

(21) Appl. No.: 17/798,750

(22) PCT Filed: Feb. 10, 2021

(86) PCT No.: PCT/JP2021/005052
§ 371 (c)(1),
(2) Date: Aug. 10, 2022

(87) PCT Pub. No.: WO2021/162055
PCT Pub. Date: Aug. 19, 2021

(65) Prior Publication Data
US 2023/0086573 A1   Mar. 23, 2023

(30) Foreign Application Priority Data
Feb. 12, 2020   (JP) ................ 2020-021509

(51) Int. Cl.
*G06N 3/045*   (2023.01)
*G06V 10/74*   (2022.01)
*G06V 10/82*   (2022.01)

(52) U.S. Cl.
CPC .......... *G06N 3/045* (2023.01); *G06V 10/761* (2022.01); *G06V 10/82* (2022.01)

(58) Field of Classification Search
CPC ...... G06N 3/045; G06N 3/0464; G06N 3/094; G06N 3/084; G06V 10/761; G06V 10/82; (Continued)

(56) References Cited

U.S. PATENT DOCUMENTS 9,594,977 B2 * 3/2017 Lin .......................... G06T 7/60
9,940,551 B1 * 4/2018 Mordvintsev ....... G06F 18/2413
(Continued)

OTHER PUBLICATIONS

International Search Report (ISR) issued on Apr. 13, 2021 in International (PCT) Application No. PCT/JP2021/005052.
(Continued)

*Primary Examiner* — Michael S Osinski
(74) *Attorney, Agent, or Firm* — Wenderoth, Lind & Ponack, L.L.P.

(57) ABSTRACT

A method includes: generating, by a deep neural network (DNN) trained using a data set of feature training images for feature learning, sample images in which different objects in a category same as a category of objects captured in the feature training images are captured; inputting the sample images to the DNN; and obtaining, from the DNN, feature vectors of the sample images, the feature vectors each resulting from one of the sample images being converted by the DNN into an n-dimensional vector, where n is an integer greater than or equal to 100. The feature vectors are used to generate an image showing a mental image.

7 Claims, 25 Drawing Sheets

(58) Field of Classification Search
CPC .... G06V 10/454; G06V 40/16; G06V 10/764; G06V 10/774; G06T 7/00; G06T 11/001; G06T 11/60; G06T 2207/20084; G06T 2207/20081; G06T 5/50; G06T 7/90; G06T 2207/20076; G06T 2207/20221; G06F 18/214

See application file for complete search history.

(56) References Cited

U.S. PATENT DOCUMENTS

| | | | | |
|---|---|---|---|---|
| 10,535,164 | B2* | 1/2020 | Shlens | G06N 3/08 |
| 10,565,757 | B2* | 2/2020 | Oxholm | G06T 3/40 |
| 10,664,963 | B1* | 5/2020 | Rossi | G06V 10/82 |
| 10,755,171 | B1* | 8/2020 | Sharifi | G06N 3/08 |
| 11,295,494 | B2* | 4/2022 | Wilensky | G06T 7/97 |
| 2016/0364625 | A1* | 12/2016 | Lin | G06T 7/60 |
| 2017/0139572 | A1* | 5/2017 | Sunkavalli | G06F 3/04845 |
| 2018/0082407 | A1* | 3/2018 | Rymkowski | G06T 11/60 |
| 2018/0082715 | A1* | 3/2018 | Rymkowski | G06V 20/10 |
| 2018/0158224 | A1* | 6/2018 | Bethge | G06T 11/60 |
| 2018/0204336 | A1* | 7/2018 | Fang | G06T 7/40 |
| 2018/0373999 | A1* | 12/2018 | Xu | G06V 20/49 |
| 2019/0026870 | A1* | 1/2019 | Hu | G06T 5/77 |
| 2019/0236814 | A1* | 8/2019 | Shlens | G06F 18/40 |
| 2020/0134797 | A1* | 4/2020 | Zhang | H04N 1/6008 |
| 2020/0151849 | A1* | 5/2020 | Liao | G06T 3/18 |
| 2021/0103770 | A1* | 4/2021 | Van Baar | G06F 18/214 |
| 2021/0158080 | A1* | 5/2021 | Price | G02B 27/017 |
| 2021/0158570 | A1* | 5/2021 | Mohandoss | H04N 9/64 |
| 2021/0224607 | A1* | 7/2021 | Deng | G06V 10/762 |
| 2021/0232863 | A1* | 7/2021 | Seo | G06F 18/214 |
| 2021/0334578 | A1* | 10/2021 | Lim | G06V 10/82 |
| 2022/0391611 | A1* | 12/2022 | Kalarot | G06N 3/09 |
| 2023/0086573 | A1* | 3/2023 | Naito | G06N 3/045 382/155 |

OTHER PUBLICATIONS

L. Brinkman et al., "Visualising mental representations: A primer on noise-based reverse correlation in social psychology", European Review of Social Psychology 2017, vol. 28 (1), 333-361, Published online: Oct. 16, 2017.

Tero Karras et. al., "A Style-Based Generator Architecture for Generative Adversarial Networks", arXiv:1812.04948v3 [cs.NE], Mar. 29, 2019.

Tero Karras et. al., "Progressive growing of gans for improved quality, stability, and variation", arXiv:1710.10196v3 [cs.NE], Feb. 26, 2018.

* cited by examiner

First feature vector

FIG. 22A

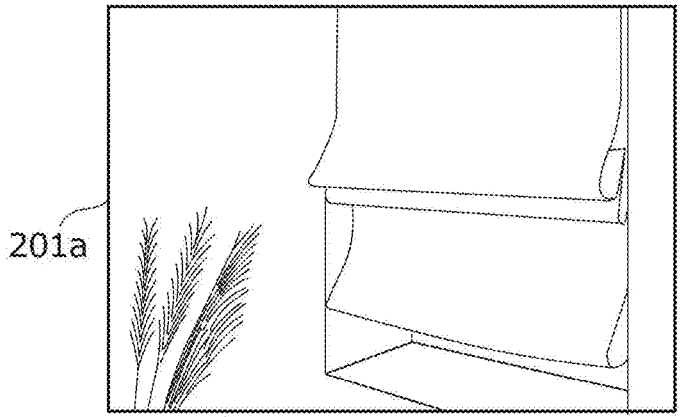

201a

DA product name          AC5064
Maker price          ~~From ¥52600~~
DA price          From ¥31560

(Price for 1.5 times folds
* 2 m width * 2 m length)
This fabric contains cotton so has
soft texture. This curtain comes
in multiple colors and well suits
space having natural atmosphere.

FIG. 22B

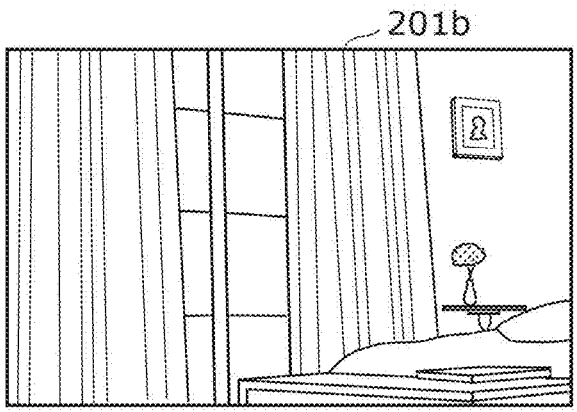

201b

DA product name          AC5462
Maker price          ~~From ¥85300~~
DA price          From ¥51180

(Price for 1.5 times folds
* 2 m width * 2 m length)
Damask design is expressed using
soft, deep colors. This curtain
matches any interior decorations.

DA product name OP7804
Maker price ~~From ¥46700~~
DA price From ¥23350

(Price for 1.5 times folds
* 2 m width * 2 m length)
Wide striped design expressed
using only woven fabric well
matches any space.

MENTAL IMAGE VISUALIZATION METHOD, MENTAL IMAGE VISUALIZATION DEVICE AND RECORDING MEDIUM

TECHNICAL FIELD

The present disclosure relates to a mental image visualization method, a mental image visualization device, and a recording medium.

BACKGROUND ART

It is known that a person makes a sensory determination by comparing a mental image that the person has in his/her mind and an image in front of the person (a visual object). Here, a sense is sensory capability for receiving stimulus from the outside, which involves determination of a specific value that a person feels when the person sees a visual object. A mental image is an image (a mental representation) that appears in his/her mind.

For example, Non Patent Literature (NPT 1) discloses a technology for visualizing a mental image. According to NPT 1, various face images are obtained by applying random noise to a base image that is a face image provided in advance. NPT 1 discloses a technology for visualizing a mental image that a subject has and is related to racial determination based on a face, by selecting a face image that is close to an image of a face of a human race that the subject has from among the various face images using psychological reverse correlation. Note that psychological reverse correlation is technology for visualizing an image feature that contributes to generating a sense such as, for example, feeling that something is beautiful, by focusing on a relation between such a sense and a stimulus that is presented when the sense arises.

CITATION LIST

Non Patent Literature

[NPL 1] Visualising mental representations: A primer on noise-based reverse correlation in social psychology, L Brinkman, A Todorov, R Dotsch European Review of Social Psychology 28 (1), 333-361

SUMMARY OF INVENTION

Technical Problem

However, according to the technology disclosed in NPT 1, various face images obtained by applying random noise to a base image are images derived from the base image. Consequently, such various face images are strongly restricted by the base image provided in advance. Accordingly, a face image selected from among the various face images may be close to but different from a mental image of a person who has made the selection. The technology disclosed in NPT 1 also has a problem that the base image provided in advance has low quality although the base image is obtained by averaging face images obtained from a database.

The present disclosure has been conceived in light of the above circumstances, and an object thereof is to provide a mental image visualization method, a mental image visualization device, and a recording medium that can visualize mental images that a person has into images with high quality.

Solution to Problem

In order to address the above problem, a mental image visualization method according to an aspect of the present disclosure includes: generating, by a deep neural network (DNN) trained using a data set of feature training images for feature learning, sample images in which different objects in a category same as a category of objects captured in the feature training images are captured; inputting the sample images to the DNN; and obtaining feature vectors of the sample images from the DNN, the feature vectors each resulting from one of the sample images being converted by the DNN into an n-dimensional vector, where n is an integer greater than or equal to 100. The feature vectors are used to generate an image showing a mental image.

Furthermore, in order to address to the above problem, a mental image visualization device according to an aspect of the present disclosure includes: a deep neural network (DNN) trained using a data set of feature training images for feature learning; an obtainer that obtains sample images generated by the DNN, the sample images being images in which different objects in a category same as a category of objects captured in the feature training images are captured; and an inputter that inputs the sample images to the DNN. The obtainer obtains feature vectors of the sample images from the DNN, the feature vectors each resulting from one of the sample images being converted by the DNN into an n-dimensional vector, where n is an integer greater than or equal to 100, and the feature vectors are used to generate an image showing a mental image.

Note that these general and specific aspects may be implemented using a system, a method, an integrated circuit, a computer program, a computer-readable recording medium such as a CD-ROM, or any combination of systems, methods, integrated circuits, computer programs, and recording media.

Advantageous Effects of Invention

According to the mental image visualization method and others according to the present disclosure, a mental image that a person has can be visualized into an image with higher quality.

BRIEF DESCRIPTION OF DRAWINGS

FIG. 22A illustrates an example of a recommendation candidate image presented by a recommended image generation UI according to Embodiment 3.

FIG. 22B illustrates an example of a recommendation candidate image presented by the recommended image generation UI according to Embodiment 3.

DESCRIPTION OF EMBODIMENTS

The embodiments described below each show a specific example of the present disclosure. The numerical values, shapes, materials, elements, the arrangement and connection of the elements, and others described in the following embodiments are examples, and thus are not intended to limit the present disclosure. Out of the elements in the following embodiments, elements not recited in any of the independent claims each showing an embodiment according to an aspect of the present disclosure are described as arbitrary elements. The embodiments of the present disclosure are not limited to the current independent claims, and can also be expressed by other independent claims.

Embodiment 1

In the following, Embodiment 1 is to be described with reference to the drawings.

1. Mental Image Visualization Device 1

Figure 1:
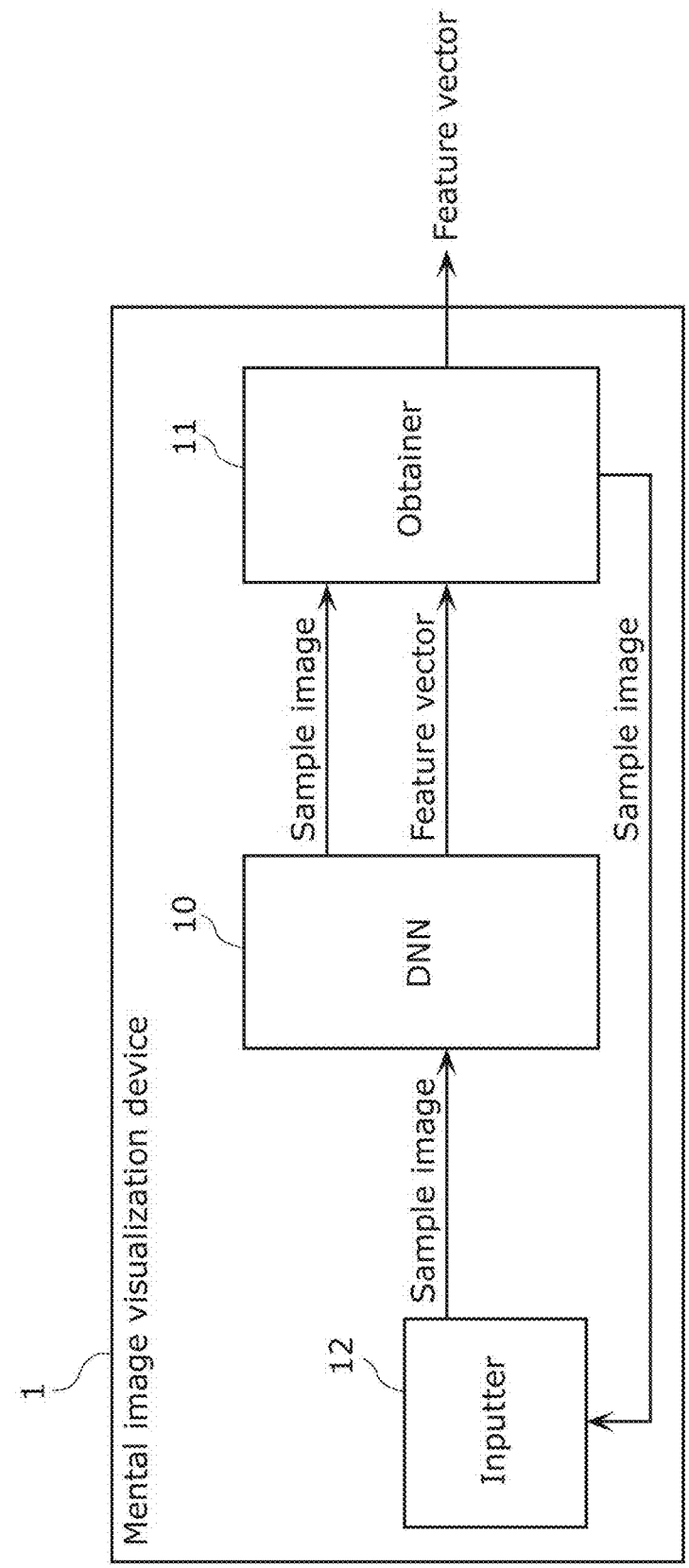
FIG. 1 is a block diagram illustrating an example of a configuration of a mental image visualization device according to Embodiment 1.

FIG. 1 is a block diagram illustrating an example of a configuration of mental image visualization device 1 according to Embodiment 1. Mental image visualization device 1 is acquired by using, for instance, a computer in which a deep neural network (DNN) is used. More specifically, mental image visualization device 1 generates sample images using DNN 10. Furthermore, mental image visualization device 1 obtains feature vectors of the generated sample images, using DNN 10. Note that in the following, a sample image is a face image, for example, and a mental image is to be described as an image that relates to beauty and ugliness of a face, yet the sample and mental images are not limited thereto. For example, a sample image may show an appearance of a vehicle, an appearance of a building, or a product. Similarly, a mental image may not relate to beauty and ugliness of a face, as long as a mental image relates to sensory adjectives. For example, a mental image may relate to an image with regard to a favorable/unfavorable appearance of a vehicle, a favorable/unfavorable appearance of a building, or a favorable/unfavorable product. In addition, an optional adjective such as modern or Japanese can be used as a sensory adjective.

In the present embodiment, mental image visualization device 1 includes DNN 10, obtainer 11, and inputter 12, as illustrated in FIG. 1. The following describes details of the elements.

1-1. DNN 10

DNN 10 includes a multi-layer neural network trained using a data set of feature training images for feature leaning. DNN 10 generates sample images in which different objects in the same category as objects captured in the feature training images are captured. The data set of feature training images may include various face images obtained from an existing database, or may include various face images created by DNN 10.

When sample images are input from inputter 12, DNN 10 generates feature vectors of the sample images each obtained by converting one of the sample images into an n-dimensional vector (n is an integer greater than or equal to 100). N-dimensional feature vectors are used to generate an image showing a mental image.

Here, DNN 10 may include a style-based generator architecture for generative adversarial networks (styleGAN), for example. Note that DNN 10 is not limited to including the styleGAN, and may include another generative adversarial network (GAN) or another multi-layer neural network, as long as sample images can be generated and furthermore, n-dimensional feature vectors of the input sample images can be generated.

<StyleGAN>

A styleGAN is a type of a generative adversarial network (GAN), and can generate a high-resolution image having 1024×1024 pixels, for example. In addition, when a portrait image is to be generated, the styleGAN can generate an image while attributes are controlled by separating global attributes of a portrait image (such as the contour of the person's face and whether or not he/she is wearing glasses) and local attributes thereof (such as wrinkles and a skin type). Here, a GAN is a type of a model (a generation model) that learns training data and generates new data similar to the learned data. In other words, a GAN is an architecture that includes two networks, namely, a generator and a discriminator, and is trained by causing the two networks to compete, and learns features without being given with correct answer data (through unsupervised learning). A GAN can generate non-existing data, and can change data according to existing data, by learning features from data.

Figure 2:
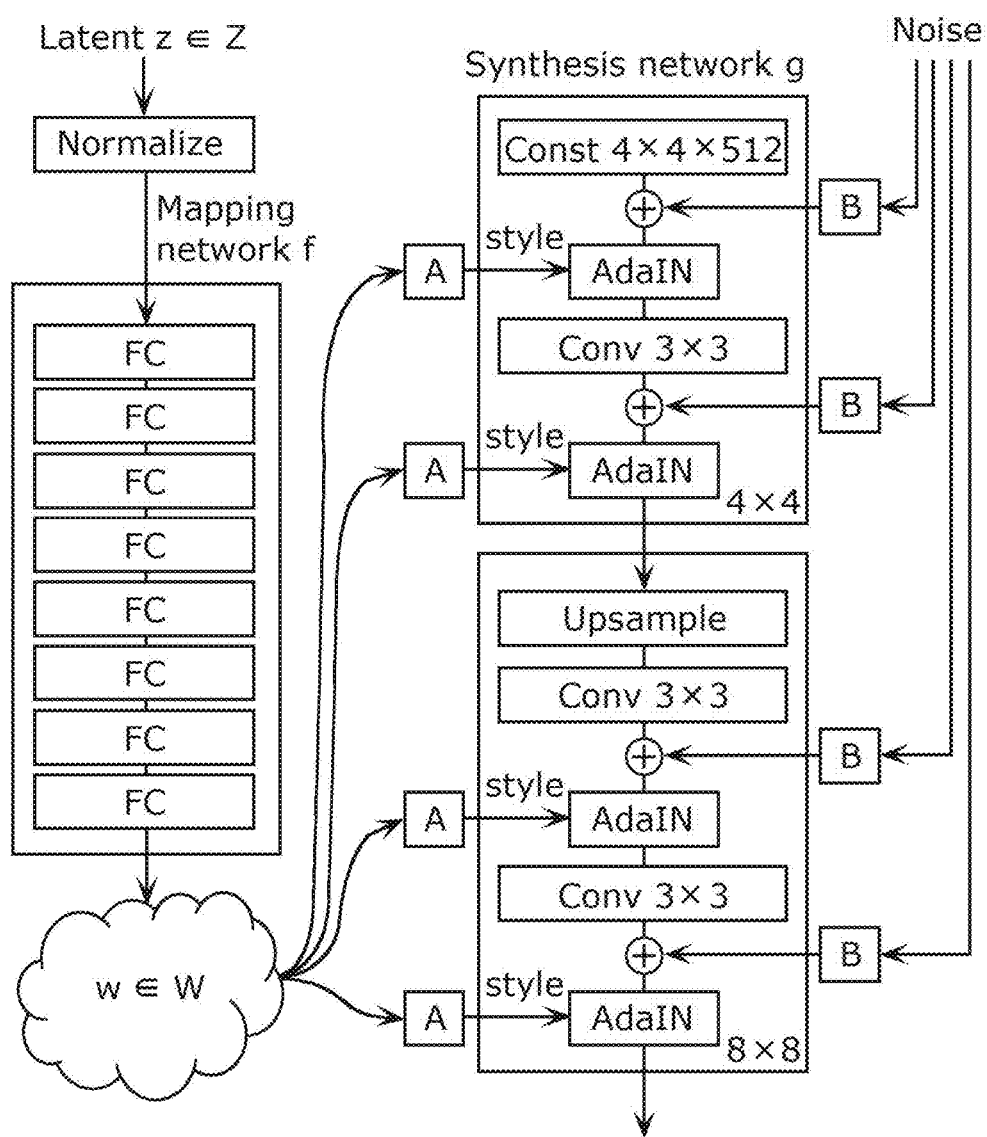
FIG. 2 illustrates a structure of a generator part of a style-based generator architecture for generative adversarial networks (styleGAN).

FIG. 2 illustrates a structure of a generator part of the styleGAN.

The generator of the styleGAN includes a mapping network (mapping network f) and a synthesis network (synthesis network g), as illustrated in FIG. 2.

The mapping network includes multiple fully connected layers (eight fully connected layers in the drawing) (each fully connected layer connects all the new neurons in the previous and following layers). The output of the mapping network has the same size (512×1) as the input layer. The mapping network obtains an intermediate vector, which is also referred to as intermediate latent variable w (w∈W), by mapping an input vector (latent variable z) to another space (intermediate latent space W).

The synthesis network includes multiple layers (18 layers in the drawing). The output of the final layer of the synthesis network is converted into RGB. The synthesis network includes adaptive instance normalization (AdaIN) layers and convolution layers.

Here, it is known that local attributes such as hair and wrinkles of a portrait image can be treated as detailed local features that can be regarded as being probabilistic. The synthesis network controls such local features by directly applying noise in pixel units immediately after each convolution layer. The AdaIN layers each synthesize a vector controlled by applying noise to the output of each convolution layer with a vector for an image obtained by applying affine transformation to an intermediate vector obtained by the mapping network. The AdaIN layers each perform processing on an output from a convolution layer in resolution scales (4×4, 8×8, and so on). The processing performed by the AdaIN layers is normalization processing in feature map units (channel units). Accordingly, global attributes over the entire image (a style of the image) can be changed for each resolution scale (4×4, 8×8, and so on), by the AdaIN layers performing processing.

Figure 3A:
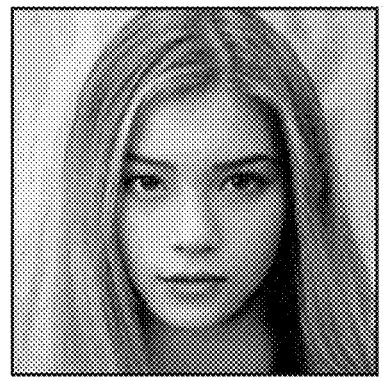
FIG. 3A illustrates an example of a sample image according to Embodiment 1.
Figure 3B:
FIG. 3B illustrates an example of a feature vector of the sample image illustrated in FIG. 3A.

FIG. 3A illustrates an example of a sample image according to Embodiment 1. FIG. 3B illustrates an example of a feature vector of the sample image illustrated in FIG. 3A. Note that the sample image illustrated in FIG. 3A is expressed using a gray scale, but is not limited to such an image, and may be expressed using colors. The same applies to an image expressed using colors.

In the present embodiment, DNN 10 is trained using a data set that includes face images for learning features of face images, as feature training images. Accordingly, DNN 10 can generate sample images that are face images, for example, using the generator of the styleGAN. For example, DNN 10 can generate, as a sample image, a face image of a woman who does not exist, as illustrated in FIG. 3A.

Here, the styleGAN is trained using a data set that includes face images for learning features of face images, as feature training images. The inventors have found that in this case, when a face image different from a feature training image is input to the mapping network of the trained styleGAN, a feature vector converted into a 512-dimensional vector can be obtained as an intermediate vector. In other words, the inventors have found that the mapping network of the styleGAN functions as a neural network that converts, into a 512-dimensional feature vector, an image that includes 512×512 pixels or 1024×1024 pixels, for example.

Accordingly, when one of the generated sample images is input, DNN 10 generates a feature vector obtained by the sample image being converted into a 512-dimensional vector, using a part of the generator of the styleGAN, that is, the mapping network. For example, DNN 10 can generate a 512-dimensional feature vector illustrated in FIG. 3B from the sample image illustrated in FIG. 3A.

1-2. Obtainer 11

Obtainer 11 obtains, from DNN 10, a feature vector of a sample image input from inputter 12 to DNN 10. When DNN 10 includes a styleGAN, obtainer 11 obtains a feature vector by obtaining an output from the mapping network of the styleGAN.

1-3. Inputter 12

Inputter 12 inputs sample images to DNN 10. In the present embodiment, inputter 12 inputs to DNN 10 sample images output from obtainer 11.

1-4. Hardware Configuration

Figure 4:
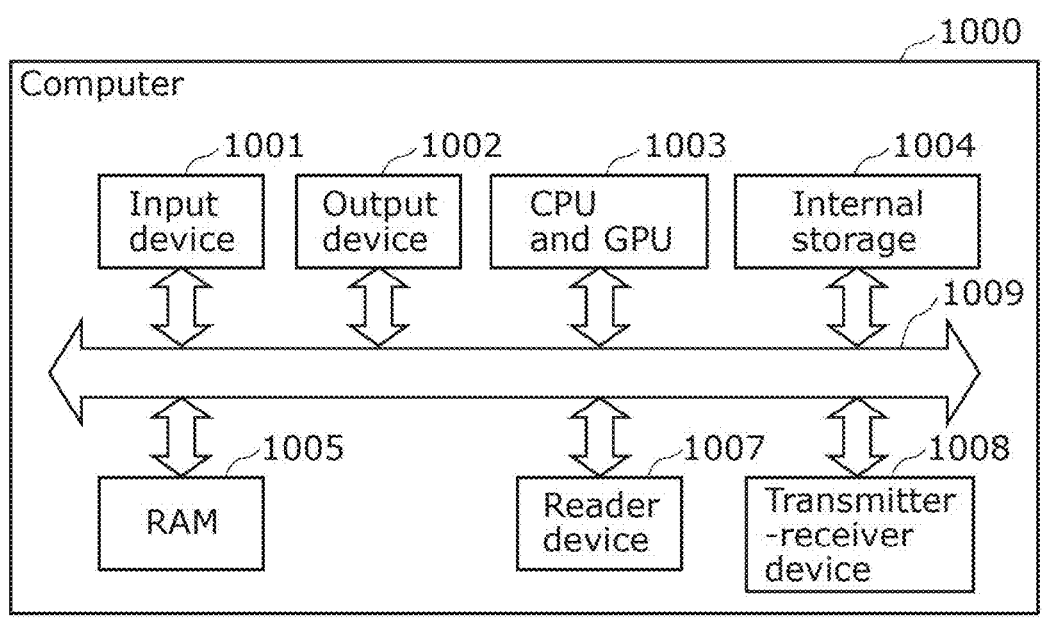
FIG. 4 illustrates an example of a hardware configuration of a computer that acquires, using software, functions of the mental image visualization device according to Embodiment 1.

Next, a hardware configuration of mental image visualization device 1 according to the present embodiment is to be described with reference to FIG. 4. FIG. 4 illustrates an example of a hardware configuration of computer 1000 that acquires functions for visualizing a mental image using software according to the present embodiment.

Computer 1000 includes input device 1001, output device 1002, CPU and GPU 1003, internal storage 1004, random access memory (RAM) 1005, reader device 1007, transmitter-receiver device 1008, and bus 1009, as illustrated in FIG. 4. Input device 1001, output device 1002, CPU and GPU 1003, internal storage 1004, RAM 1005, reader device 1007, and transmitter-receiver device 1008 are connected by bus 1009.

Input device 1001 serves as a user interface such as an input button, a touch pad, or a touch panel display, and receives operations from a user. Note that input device 1001 may be configured to receive voice operation and remote operation through a remote control, in addition to touch operation made by a user.

Internal storage 1004 is a flash memory, for instance. Internal storage 1004 may store in advance at least one of a program for achieving functions of mental image visualization device 1 or an application that uses a functional configuration of mental image visualization device 1.

RAM 1005 is a random access memory, and is used to store data, for instance, when a program or an application is executed.

Reader device 1007 reads information from a recording medium such as a universal serial bus (USB) memory. Reader device 1007 reads a program or an application from a recording medium as above on which the program or the application is recorded, and stores the program/application into internal storage 1004.

Transmitter-receiver device 1008 is a communication circuit for wireless or wired communication. For example, transmitter-receiver device 1008 communicates with a server device connected to a network, downloads a program or an application as above from the server device, and stores the program/application into internal storage 1004.

CPU and GPU 1003 are a central processing unit and a graphics processing unit, respectively, copy a program or an application stored in internal storage 1004 into RAM 1005, and sequentially read and execute commands included in the program/application from RAM 1005.

2. Operation of Mental Image Visualization Device 1

Next, operation of mental image visualization device 1 having a configuration as above is to be described.

Figure 5:
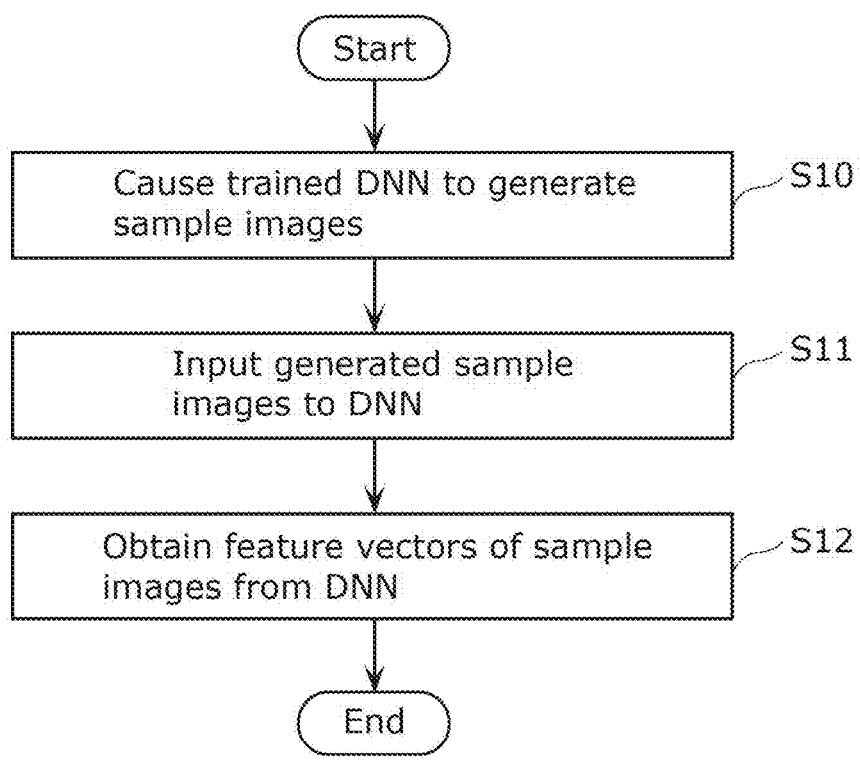
FIG. 5 is a flowchart illustrating operation of the mental image visualization device according to Embodiment 1.

FIG. 5 is a flowchart illustrating operation of mental image visualization device 1 according to Embodiment 1.

First, mental image visualization device 1 causes trained DNN 10 to generate sample images (S10). More specifically, mental image visualization device 1 trains DNN 10 illustrated in FIG. 1, using a data set of feature training images for feature leaning. Mental image visualization device 1 causes DNN 10 trained in this manner to generate sample images in which different objects in the same category as the category of objects captured in the feature training images are captured.

Next, mental image visualization device 1 inputs the sample images generated in step S10 to DNN 10 (S11).

Next, mental image visualization device 1 obtains feature vectors of the sample images generated in step S10 from DNN 10 (S12). More specifically, mental image visualization device 1 obtains from DNN 10 feature vectors of the sample images generated in step S10, each of which is obtained by one of the sample images being converted into an nth-dimensional vector (n is an integer greater than or equal to 100).

3. Advantageous Effects and Others

As described above, according to the present embodiment, DNN 10 trained using a data set of feature training images for feature leaning can generate sample images in which different objects in a category same as a category of objects captured in the feature training images are captured. Furthermore, DNN 10 can convert the sample images each into an n-dimensional vector (n is an integer greater than or equal to 100) to obtain feature vectors of the sample images, and thus the feature vectors can be obtained from DNN 10.

Figure 6:
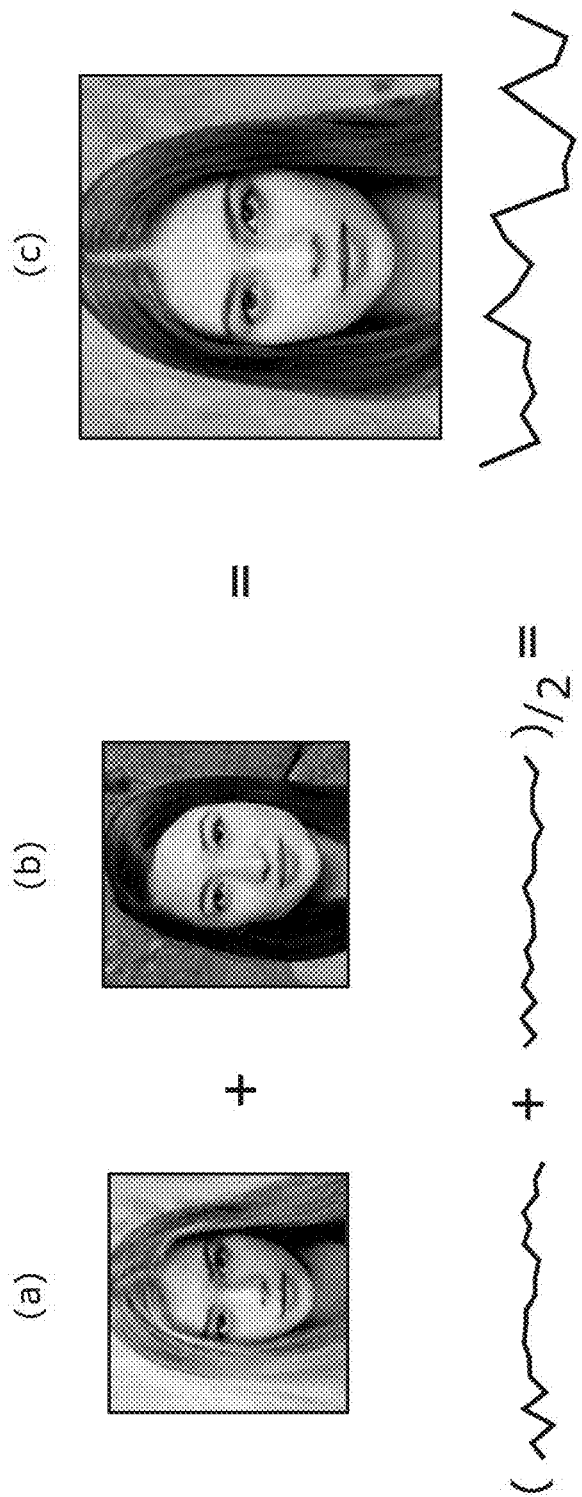
FIG. 6 illustrates an image obtained by averaging feature vectors of two sample images according to Embodiment 1.

FIG. 6 illustrates an image obtained by averaging feature vectors of two sample images according to Embodiment 1. Face images of women and feature vectors in (a) and (b) of FIG. 6 are examples of feature vectors of two different sample images.

A feature vector generated by mental image visualization device 1 according to the present embodiment is, for example, a 512-dimensional feature vector and has linearity to a certain degree. Accordingly, an image generated from a feature vector obtained by averaging feature vectors of two different sample images as illustrated in (a) and (b) of FIG. 6, for example, contains an averaged feature of the same images illustrated in (a) and (b) of FIG. 6, as shown by the face image of a woman illustrated in (c) of FIG. 6. As can be seen from (c) of FIG. 6, an image that contains an averaged feature of the sample images illustrated in (a) and (b) of FIG. 6 is a high-quality image similar to the images in (a) and (b) of FIG. 6.

Accordingly, from the results of sensory evaluation on hundreds of sample images by psychological reverse correlation, a feature vector of a sample image having the highest score of the sensory evaluation, for example, can be obtained. In this case, an image generated from a feature vector of a sample image having a high score of the sensory evaluation may be used as an image showing a mental image. In addition, from the results of sensory evaluation on hundreds of sample images by psychological reverse correlation, feature vectors of sample images having relatively high scores of sensory evaluation may be obtained. In this case, an image generated by performing nonlinear transformation F on a feature vector obtained by calculating a weighted average of feature vectors of sample images having relatively high scores of sensory evaluation may be used as an image showing a mental image. In this manner, a feature vector generated by mental image visualization device 1 according to the present embodiment can be used to generate an image showing a mental image.

Note that DNN 10 may be used as a method for generating an image from a feature vector. For example, when DNN 10 includes a styleGAN, an image can be generated from a feature vector by using a synthesis network of the styleGAN. Note that as long as a neural network that can generate an image from a multi-dimensional feature vector is used, the present embodiment is not limited to using the synthesis network of the styleGAN.

As described above, mental image visualization device 1 according to the present embodiment can generate a sample image on which sensory evaluation is conducted by psychological reverse correlation, with high quality and high resolution of 1024×1024 pixels, for example, without depending on a base image mentioned above. Furthermore, mental image visualization device 1 according to the present embodiment can generate feature vectors of the generated sample images. Accordingly, a weighted average of the feature vectors of the sample images on which sensory evaluation has been conducted by psychological reverse correlation is calculated, and an image generated from the feature vector calculated in this manner can be obtained as an image showing a mental image. Thus, mental image visualization device 1 according to the present embodiment can visualize a mental image that a person has into an image with still higher quality.

Embodiment 2

Embodiment 1 has described, as an example, a case in which a subject having a mental image to be visualized conducts sensory evaluation on a plurality (hundreds) of sample images, yet the present embodiment is not limited to such a case. Sensory evaluation may be conducted on a plurality (hundreds) of sample images by psychological reverse correlation using a deep convolution neural network (DCNN) that is pre-trained by learning preferences of a subject having a mental image to be visualized.

The following describes, as Embodiment 2, mental image visualization system 100 that includes a DCNN that conducts sensory evaluation on sample images generated by the mental image visualization device, and generates an image showing a mental image.

1. Mental Image Visualization System 100

Figure 7:
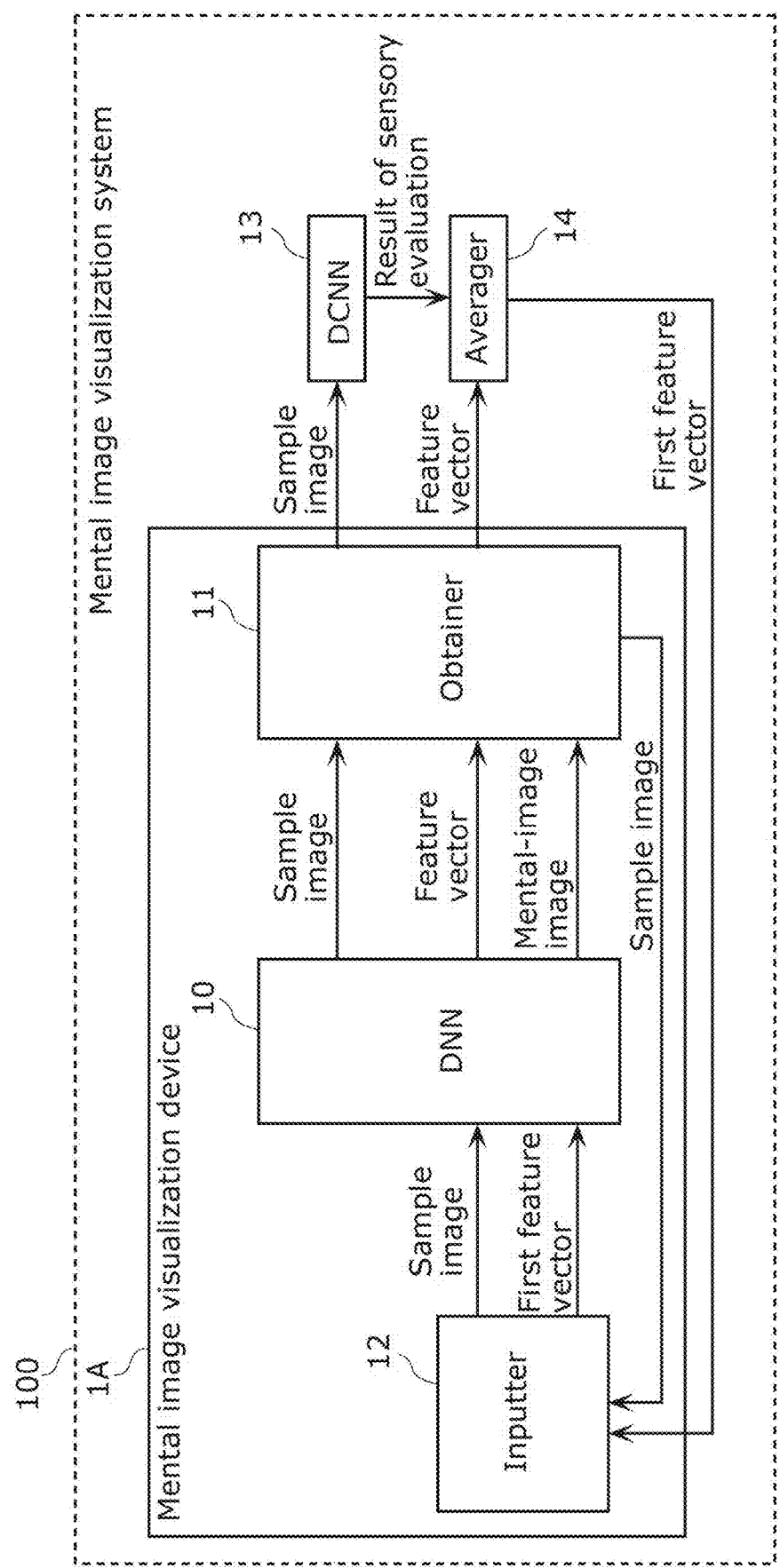
FIG. 7 is a block diagram illustrating an example of a configuration of a mental image visualization system according to Embodiment 2.

FIG. 7 is a block diagram illustrating an example of a configuration of mental image visualization system 100 according to Embodiment 2. Note that the same elements as those in FIG. 1 are given the same numerals, and a detailed description thereof is omitted. Functions of mental image visualization system 100 are achieved by software using computer 1000 illustrated in FIG. 4, similarly to Embodiment 1.

In the present embodiment, mental image visualization system 100 includes mental image visualization device 1A, DCNN 13, and averager 14. The following describes details of the elements.

1-1. Mental Image Visualization Device 1A

Mental image visualization device 1A illustrated in FIG. 7 has a configuration the same as that of mental image visualization device 1 illustrated in FIG. 1. It is clarified that in mental image visualization device 1A, DNN 10 further generates an image showing a mental image from a first feature vector obtained by averager 14.

More specifically, DNN 10 generates an image showing a mental image from a first feature vector. In the present embodiment, inputter 12 inputs a first feature vector to DNN 10. DNN 10 generates an image showing a mental image from the input first feature vector. When DNN 10 includes a styleGAN, DNN 10 causes a synthesis network of the styleGAN to generate an image showing a mental image by inputting the first feature vector to the synthesis network. Details are as described in Embodiment 1, and thus a description thereof is omitted here.

Obtainer 11 obtains the image showing a mental image, which is generated by DNN 10.

Inputter 12 inputs the first feature vector obtained from averager 14 to DNN 10.

Note that sample images and generation of feature vectors are as described in Embodiment 1, and thus a description thereof is omitted here.

1-2. DCNN 13

DCNN 13 includes a convolution neural network trained using a training data set that includes images provided using psychological reverse correlation and results of sensory evaluation on the images conducted by a subject having a mental image. The training data set may include various face images obtained from an existing database, or may include various face images created by DCNN 13. In this manner, DCNN 13 can be pre-trained to learn preference of a subject having a mental image to be visualized. In the present embodiment, images provided using psychological reverse correlation are face images, for example, similarly to Embodiment 1. Sensory evaluation on images is evaluation with regard to beauty and ugliness of a face, for example.

When each of sample images generated by mental image visualization device 1A is input, DCNN 13 predicts a result of sensory evaluation on the sample image, and outputs the predicted result as a result of sensory evaluation on the sample image by psychological reverse correlation.

Here, DCNN 13 may include a pre-trained convolution neural network (CNN), one or more convolution layers provided downstream of the CNN, and a global average pooling (GAP) layer provided downstream of the one or more convolution layers, for example. Further, the CNN includes a convolution neural network that includes convolution layers and pooling layers.

Figure 8:
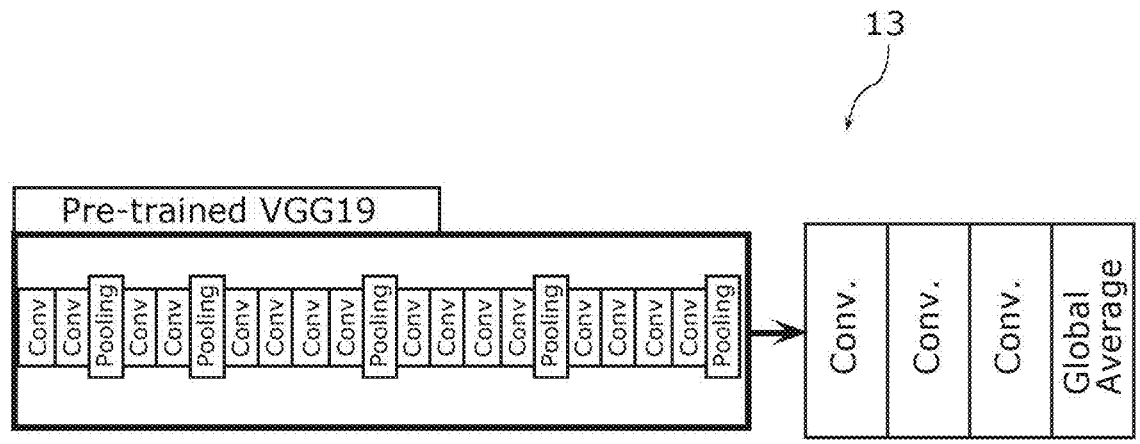
FIG. 8 illustrates an example of a network structure of a deep convolution neural network (DCNN) illustrated in FIG. 7.

FIG. 8 illustrates an example of a network structure of DCNN 13 illustrated in FIG. 7.

DCNN 13 is a convolution neural network that includes a pre-trained VGG19, three convolution layers, and one GAP layer, for example, as illustrated in FIG. 8. The pre-trained VGG19 is an example of a CNN that DCNN 13 includes. Note that the VGG19 can be obtained from a public database on the Internet, for instance. The CNN that DCNN 13 includes is not limited to the pre-trained VGG19. DCNN 13 may include one or more convolution layers downstream of the CNN, and thus is not limited to the case where three convolution layers are included as illustrated in FIG. 8.

Figure 9:
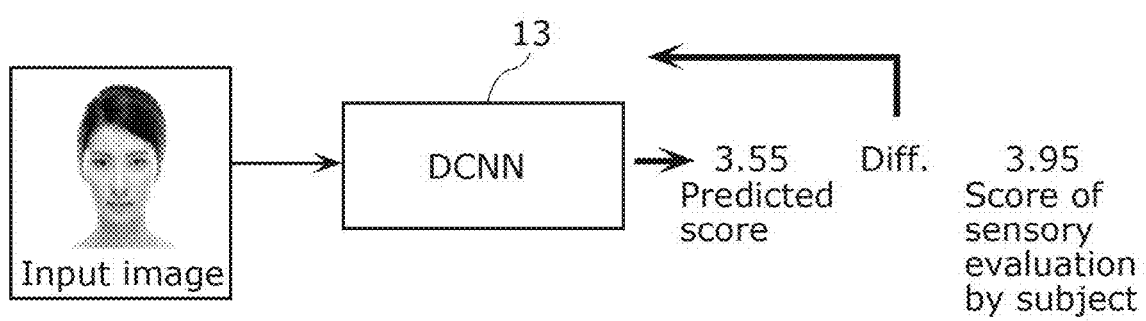
FIG. 9 is a drawing for describing a method for training the DCNN illustrated in FIG. 8.

FIG. 9 is a drawing for describing a method for training DCNN 13 illustrated in FIG. 8.

First, a training data set that includes face images provided using psychological reverse correlation, and results of sensory evaluation on the images conducted by a subject having a mental image to be visualized. In the present embodiment, the results in the training data set are results obtained by the subject giving, to each of face images in which women are captured, a score of sensory evaluation showing how beautiful the subject thinks the woman in the face image is, for example.

Next, the face images in the training data set are input to DCNN 13 one-by-one as an input image, and DCNN 13 predicts a score of sensory evaluation that the subject is to give. If there is a difference between the subject's score and the predicted score, DCNN 13 receives feedback to reduce such a difference. In this manner, DCNN 13 is trained for each of the face images in the training data set so as to minimize the difference of the face image between a score that DCNN 13 predicts and a score given by the subject. Stated differently, DCNN 13 is trained by being given correct answer data using the training data set (through supervised learning).

Accordingly, DCNN 13 can be trained to learn sensory evaluation by a subject (individual), and thus can conduct sensory evaluation on an arbitrary face image instead of the subject.

Here, according to a mental template matching hypothesis, sensory determination on, for instance, beauty and ugliness is made based on a template that an individual has in his/her mind (that is, a mental image). DCNN 13 appropriately learns a parameter thereof and thus can conduct sensory evaluation on an arbitrary face image instead of a subject. Hence, the inventors found that DCNN 13 can be trained to learn a mental image that an individual has in his/her mind.

Accordingly, DCNN 13 can be trained using a training data set as above, which is provided in advance, so that a sense (a mental image) of an individual having a special skill such as a famous artist or designer can be stored in a parameter of DCNN 13.

Figure 10:
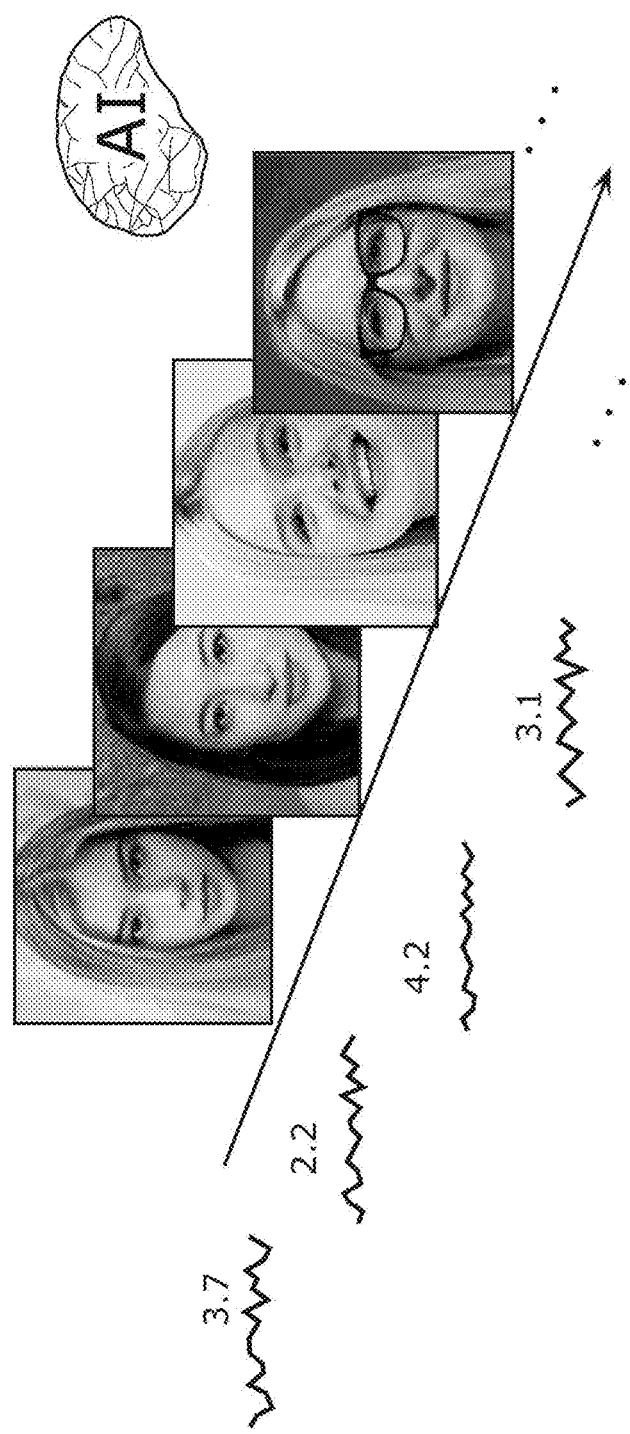
FIG. 10 illustrates examples of results of sensory evaluation on sample images according to Embodiment 2.

FIG. 10 illustrates examples of results of sensory evaluation on sample images according to Embodiment 2.

The face images of women illustrated in FIG. 10 are examples of sample images on which sensory evaluation is conducted by DCNN 13 instead of a subject. For example, 3.7, 2.2, 4.2, 3.1, . . . are examples of scores of sensory evaluation on the face images of the women that are predicted by DCNN 13 instead of the subject.

Note that FIG. 10 also illustrates feature vectors of the face images of the women.

1-3. Averager 14

Averager 14 obtains a first feature vector by performing non-linear transformation F on a weighted average of feature vectors of sample images, according to results of sensory evaluation on the sample images by psychological reverse correlation.

Averager 14 outputs the first feature vector to inputter 12 to input the first feature vector to DNN 10.

Figure 11A:
FIG. 11A illustrates an example of a first feature vector calculated by an averager according to Embodiment 2.
Figure 11B:
FIG. 11B illustrates an image showing a mental image generated from the first feature vector illustrated in FIG. 11A.

FIG. 11A illustrates an example of a first feature vector calculated by averager 14 according to Embodiment 2. FIG. 11B illustrates an image showing a mental image generated from the first feature vector illustrated in FIG. 11A.

The first feature vector illustrated in FIG. 11A is obtained by performing non-linear transformation on the result of averaging the feature vectors of the face images of the women illustrated in FIG. 10, based on the predicted scores of sensory evaluation on the face images of the women illustrated in FIG. 10. The first feature vector illustrated in FIG. 11A is input to DNN 10 by inputter 12.

Accordingly, the synthesis network of DNN 10 can generate the image illustrated in FIG. 11B as an image showing a mental image from the input first feature vector illustrated in FIG. 11A.

Note that in the present embodiment, the image illustrated in FIG. 11B corresponds to a mental image of a subject (individual) with regard to a beautiful face.

2. Advantageous Effects and Others

Figure 12:
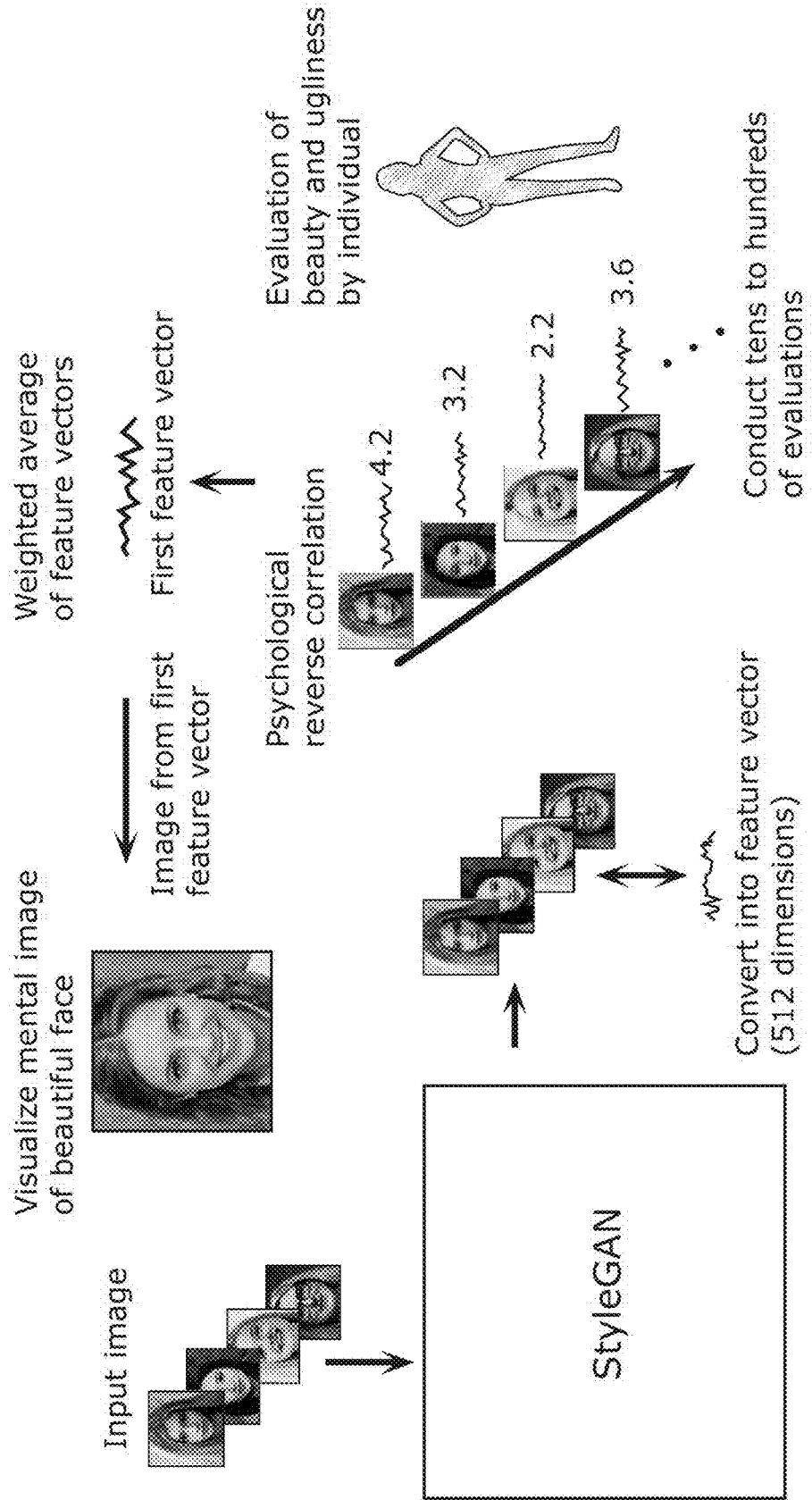
FIG. 12 illustrates an overview of a mental image visualization method with regard to beauty and ugliness evaluation according to Embodiments 1 and 2.

FIG. 12 illustrates an overview of the mental image visualization method with regard to beauty and ugliness evaluation according to Embodiments 1 and 2. FIG. 12 illustrates a mental image visualization method with regard to beauty and ugliness evaluation, based on beauty and ugliness evaluation conducted by an individual. Note that a subject having a mental image may conduct sensory evaluation on sample images generated by mental image visualization device 1A or DCNN 13 may predict results of sensory evaluation as described above.

As described above, according to the present embodiment, mental image visualization system 100 can generate an image showing a mental image from the first feature vector obtained by calculating a weighted average of feature vectors of sample images and thereafter performing non-linear transformation on the weighted average, according to results of sensory evaluation on the generated sample images.

The sample images generated by mental image visualization device 1A are not images derived from a base image that is an actual image selected by a person whose mental image is to be visualized or provided in advance, but is an image resulting from transformation based on a non-actual image or an actual image. Furthermore, an image generated from the first feature vector obtained by performing non-linear transformation on a weighted average of feature vectors of the sample images can be used as an image showing a mental image, and thus an image showing a mental image is not limited only to a sample image provided in advance. Thus, according to the present embodiment, an image showing an image further closer to a mental image that a subject has or an image showing the mental image itself can be generated.

The sample images generated by mental image visualization device 1A are high-quality images having a high resolution of 1024×1024 pixels, for example. Accordingly, an image showing a mental image, which is generated from a first feature vector calculated from feature vectors of the sample images can also be generated as high-quality images.

Thus, mental image visualization system 100 according to the present embodiment can visualize a mental image that a person has into an image with still higher quality.

According to the present embodiment, DCNN 13 can be trained to learn sensory evaluation (a mental image) for each person. Accordingly, a sense (a mental image) of a person having a special skill such as a famous artist or designer can be stored in a parameter of DCNN 13.

As a result, an artist or designer can store, as a parameter, his/her sense at a certain point in time into a multi-layer neural network, that is, DCNN 13. Thus, the artist or designer can create artwork or designs, referring to, at any point in time, images showing his/her sense in the past.

Furthermore, if a training data set that includes images provided using psychological reverse correlation and evaluation results on the images obtained by a specific group such as men in forties living in the Kansai area, for example, can be provided, DCNN 13 can be trained to learn mental images that people in such a specific group have.

Sensory evaluation as to whether a certain design is favorable or unfavorable, for example, can be predicted, using DCNN 13 that has learned sensory evaluation conducted by (mental images of) a specific subject or a specific group. Accordingly, this yields advantageous effects of eliminating necessity of actually conducting a wide-scale market research as to whether such a design is favorable or unfavorable. Furthermore, this also yields advantageous effects of knowing in advance results of sensory evaluation of target customers, without conducting a wide-scale market research on that design.

Mental image visualization system 100 according to the present embodiment can generate an image showing a mental image of a designer, and thus people other than the designer, such as a developer and a salesperson, for example, can share the mental image of the designer as an image. For example, a mental image of a design that a designer or a developer has can be visualized and shared in a group in the development phase of a product image.

Further, mental image visualization system 100 according to the present embodiment can generate, taking a short time, an image showing a visualized image (mental image) that a customer has who wishes to have a custom-built house, for instance. Accordingly, this also yields advantageous effects of accurately developing product designs that satisfy customers' demand.

Furthermore, mental image visualization system 100 according to the present embodiment can visualize, for example, an ideal appearance of a house that a high-income earner has in mind into a specific image, and thus advantageous effects of readily reflecting such an image on the design made by a building company.

Note that mental image visualization system 100 according to the present embodiment can visualize a specific ideal face for each person into a high-quality image. Accordingly, an image showing an image of an ideal face after makeup or cosmetic surgery is done for each person can be shared with others.

[Variation 1]

Embodiment 2 has described the case where a weighted average of feature vectors of sample images output by mental image visualization device 1A is calculated according to results of DCNN 13 conducting sensory evaluation on the sample images by psychological reverse correlation. A first feature vector is obtained by compressing, to one dimension, 512 dimensions of feature vectors of sample images by calculating a weighted average, but nevertheless dimensional compression is not limited to compressing to one dimension. Dimensional compression may be compression to about two or three dimensions. In the following, the case where dimensional compression to about two or three dimensions is to be described as Variation 1 of Embodiment 2.

1. Mental Image Visualization System 100B

Figure 13:
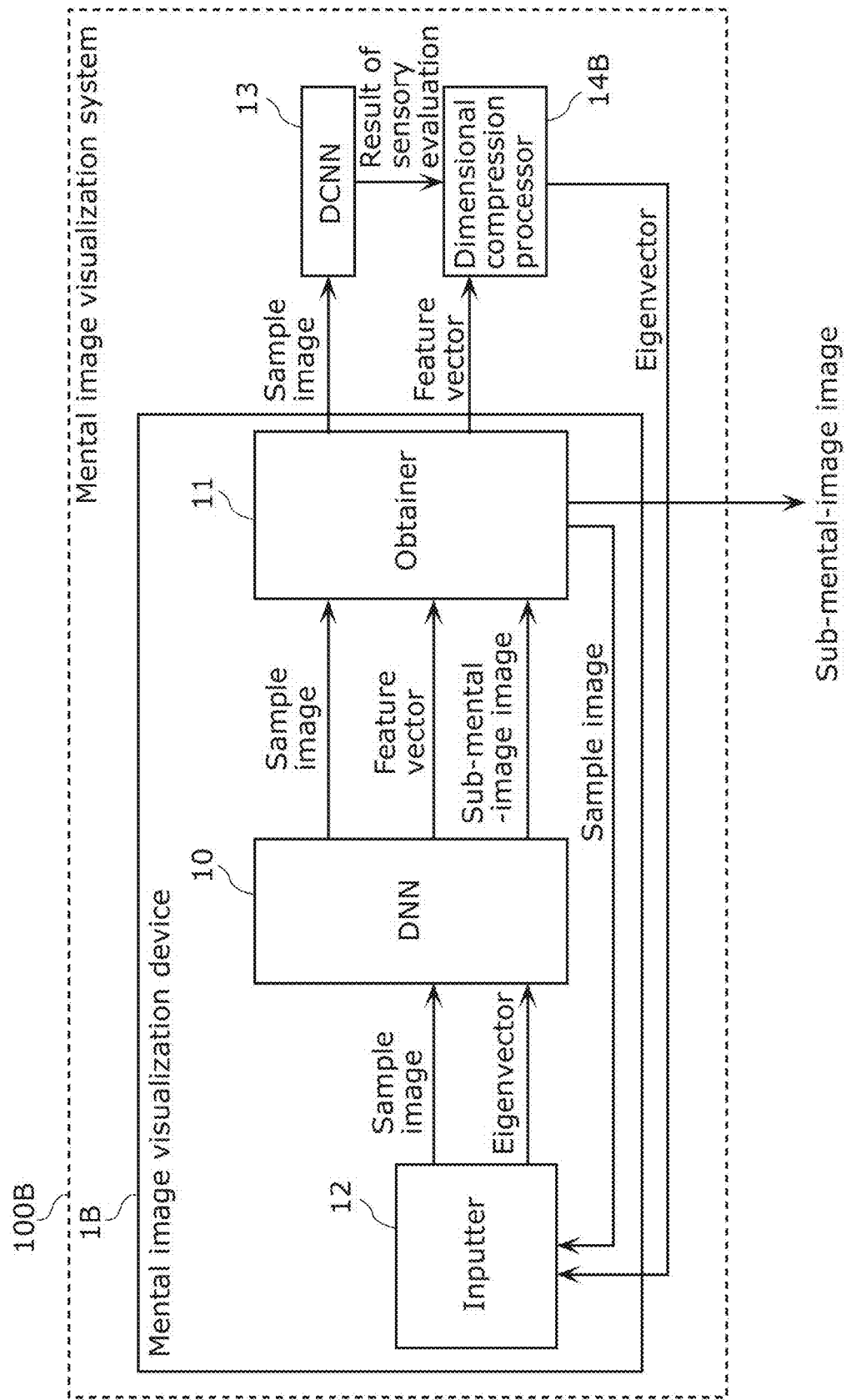
FIG. 13 is a block diagram illustrating an example of a configuration of a mental image visualization system according to Variation 1 of Embodiment 2.

FIG. 13 is a block diagram illustrating an example of a configuration of mental image visualization system 100B according to Variation 1 of Embodiment 2. Note that the same elements as those in FIG. 7 are given the same numerals, and a detailed description thereof is omitted. Functions of mental image visualization system 100B are achieved by software using computer 1000 illustrated in FIG. 4, similarly to Embodiment 1.

Mental image visualization system 100B illustrated in FIG. 13 has a different configuration from that of mental image visualization system 100 illustrated in FIG. 7 in that dimensional compression processor 14B is included instead of averager 14. In the following, details of elements are described, focusing on different points from Embodiment 2.

1-1. Dimensional Compression Processor 14B

Dimensional compression processor 14B calculates feature vectors obtained by weighting feature vectors of sample images output by mental image visualization device 1B according to results of DCNN 13 conducting sensory evaluation on the sample images by psychological reverse correlation. Dimensional compression processor 14B outputs eigenvectors obtained by performing dimensional compression on the weighted feature vectors using spike-triggered covariance (STC) analysis.

Figure 14:
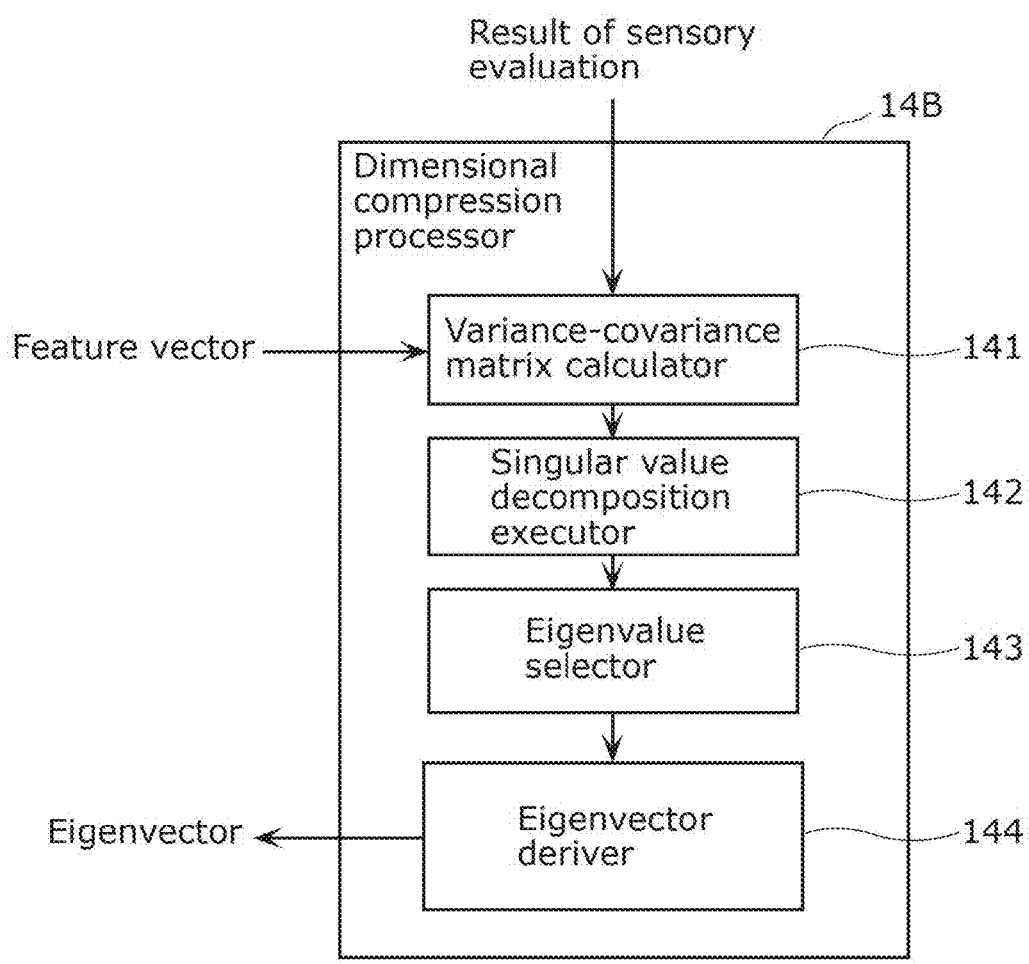
FIG. 14 is a block diagram illustrating an example of a detailed configuration of a dimensional compression processor according to Variation 1 of Embodiment 2.

FIG. 14 is a block diagram illustrating an example of a detailed configuration of dimensional compression processor 14B according to Variation 1 of Embodiment 2.

Dimensional compression processor 14B includes variance-covariance matrix calculator 141, singular value decomposition executor 142, eigenvalue selector 143, and eigenvector deriver 144, as illustrated in FIG. 14.

Variance-covariance matrix calculator 141 weights feature vectors of sample images, according to results of sensory evaluation on the sample images by psychological reverse correlation. Variance-covariance matrix calculator 141 calculates a variance-covariance matrix of the weighted feature vectors by spike-triggered covariance (STC) analysis.

Singular value decomposition executor 142 executes singular value decomposition on the calculated variance-covariance matrix, to obtain eigenvalues.

In this variation, an STC matrix of the weighted feature vectors may be calculated, and singular value decomposition may be performed thereon to obtain eigenvalues. STC analysis is an analysis method similar to principal component analysis. STC analysis can be considered as a method of redefining to orthogonalize axes of a space that maximize variance of a distribution of features of interest in a distribution obtained by giving random values to multidimensional vectors, for example. The axes of a space are redefined to be orthogonalize in a multidimensional space, by calculating eigenvectors of an STC matrix. A desired distribution of features is re-expressed using the redefined axes, so as to be expressed in a manner in which the dimension of a multidimensional vector is reduced (compressed).

Eigenvalue selector 143 selects at least two eigenvalues out of a plurality of eigenvalues obtained by singular value decomposition executor 142. For example, eigenvalue selector 143 may select an eigenvalue having a value of variance greater than and an eigenvalue having a value of variance smaller than an average when the eigenvalues obtained by singular value decomposition executor 142 are arranged in the ranking order. In this variation, eigenvalue selector 143 selects three eigenvalues such as the greatest and second greatest eigenvalues and the smallest eigenvalue when the eigenvalues are arranged in the ranking order.

Eigenvector deriver 144 derives at least two eigenvectors each having one of the at least two eigenvalues selected by eigenvalue selector 143. Eigenvector deriver 144 outputs the derived at least two eigenvectors to mental image visualization device 1B. In this variation, eigenvector deriver 144 derives three eigenvectors having the greatest and second greatest eigenvalues and the smallest eigenvalue. In this case, eigenvector deriver 144 outputs the derived three eigenvectors to inputter 12 of mental image visualization device 1B.

1-2. Mental Image Visualization Device 1B

Mental image visualization device 1B illustrated in FIG. 13 has a configuration the same as those of mental image visualization devices 1 and 1A illustrated in FIGS. 1 and 7, respectively. DNN 10 of mental image visualization device 1B generates at least two images showing at least two sub-mental images, from at least two eigenvectors obtained by dimensional compression processor 14B. The at least two sub-mental images each corresponds to an image obtained by decomposing components of a mental image stated above.

In this variation, inputter 12 inputs the at least two eigenvectors obtained from dimensional compression processor 14B to DNN 10.

Inputter 12 inputs each of the at least two eigenvectors to DNN 10. DNN 10 generates at least two images showing at least two sub-mental images from the input at least two eigenvectors. Here, when DNN 10 includes a styleGAN, inputter 12 inputs each of the at least two eigenvectors to the generator of the styleGAN. The generator of the styleGAN generates at least two images showing at least two sub-mental images that form a mental image and are on condition of mutual orthogonality.

Note that dimensional compression processor 14B generates an image showing an approximate mental image, if a vector resulting from adding eigenvectors each having one of eigenvalues obtained by dimensional compression processor 14B executing singular value decomposition is input to DNN 10. Here, a reason why the term "approximate" is stated is that there is information removed by dimensional compression. Thus, decomposed components of a mental image each correspond to a sub-mental image. Generating a sub-mental image from an eigenvector is similar to generating a mental image from a first feature vector, and is as described in Embodiment 1, and thus description of details is omitted here.

Obtainer 11 obtains an image showing a sub-mental image, which is generated by DNN 10.

Note that sample images and generation of feature vectors, for instance, are as described in Embodiment 1, and thus a description thereof is omitted here.

2. Example of Operation of Mental Image Visualization System 100B

An example of operation of mental image visualization system 100B having the above configuration is to be described. In the example of operation, DNN 10 of mental image visualization device 1B is assumed to include a styleGAN, and different points from Embodiment 2 are to be mainly described.

Figure 15:
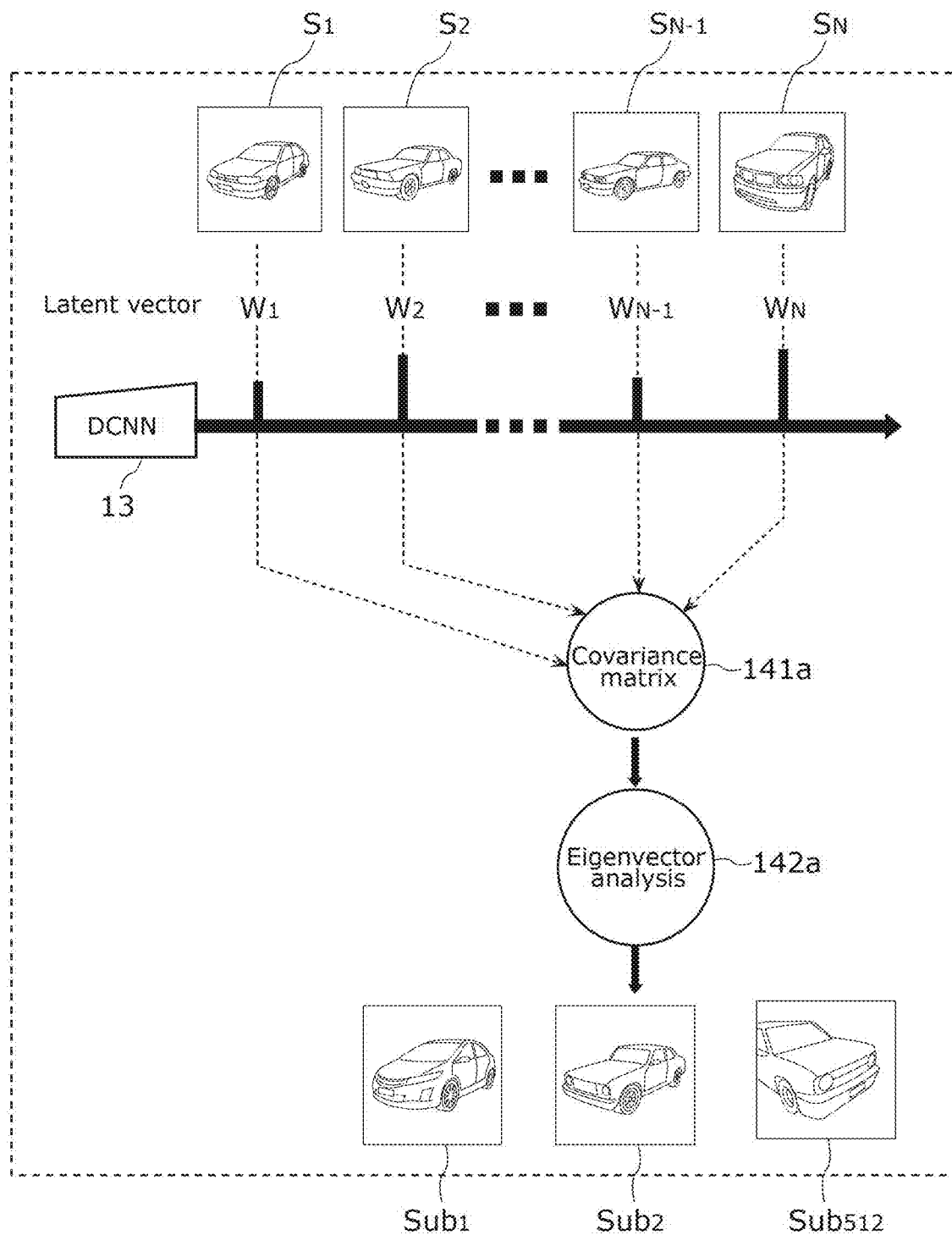
FIG. 15 macroscopically illustrates an example of operation of the mental image visualization system according to Variation 1 of Embodiment 2.

FIG. 15 macroscopically illustrates an example of operation of mental image visualization system 100B according to Variation 1 of Embodiment 2.

The example of operation illustrated in FIG. 15 shows the case where images showing sub-mental images with regard to favorable and unfavorable appearances of automobiles. FIG. 15 illustrates, as sample images $S_1, S_2, \ldots, S_{N-1}$, and $S_N$, sample images showing appearances of automobiles, which have been generated by mental image visualization device 1B. Sample images $S_1, S_2, \ldots, S_{N-1}$, and $S_N$ are each represented by a 512-dimensional feature vector as described above, by using mental image visualization system 100B. Under sample images $S_1, S_2, \ldots, S_{N-1}$, and $S_N$, feature vectors $W_1, W_2, \ldots, W_{N-1}$, and $W_N$ of sample images $S_1, S_2, \ldots, S_{N-1}$, and $S_N$ are shown.

In this example of operation, first, DCNN 13 outputs results of sensory evaluation on sample images $S_1, S_2, \ldots, S_{N-1}$, and $S_N$ by psychological reverse correlation.

Next, dimensional compression processor 14B calculates variance-covariance matrix 141a. Specifically, dimensional compression processor 14B calculates, by STC analysis, variance-covariance matrix 141a of feature vectors $W_1, W_2, \ldots, W_{N-1}$, and $W_N$ that are weighted according to the results of sensory evaluation on sample images $S_1, S_2, \ldots, S_{N-1}$, and $S_N$ by psychological reverse correlation.

Next, dimensional compression processor 14B performs eigenvector analysis 142a. Specifically, dimensional compression processor 14B executes singular value decomposition on calculated variance-covariance matrix 141a to obtain 512 eigenvalues. Dimensional compression processor 14B creates a graph in which the 512 eigenvalues obtained by executing singular value decomposition are arranged in the ranking order, as illustrated in FIG. 16A, for example.

Figure 16A:
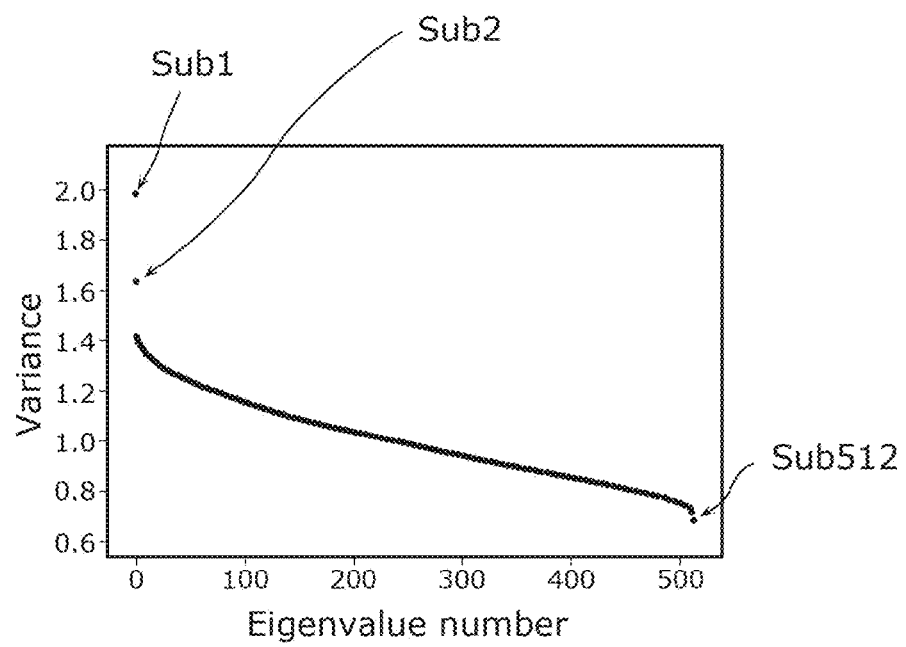
FIG. 16A illustrates an example of a graph in which eigenvalues obtained by executing singular value decomposition are arranged in the ranking order, according to the example of operation illustrated in FIG. 15.

Here, FIG. 16A illustrates an example of a graph in which eigenvalues obtained by executing singular value decomposition are arranged in the ranking order, according to the example of operation illustrated in FIG. 15. The vertical axis shown in FIG. 16A indicates variance (variation). As can be seen from FIG. 16A, out of eigenvalues expressed in dots, some overlap so as to appear in a line, and some are spaced apart from the eigenvalues that appear in a line. The dots spaced apart are eigenvalues having the greatest and second greatest variance (variation) values and an eigenvalue having the smallest variance (variation) value when eigenvalues are arranged in the ranking order, and are denoted by Sub1, Sub2, and Sub512.

In this example of operation, dimensional compression processor 14B selects three eigenvalues, namely, the greatest, second greatest, and smallest eigenvalues that are denoted by Sub1, Sub2, and Sub512. Note that the three eigenvalues may be selected by operation on mental image visualization system 100B or by a predetermined algorithm.

Next, dimensional compression processor 14B derives three eigenvectors having three eigenvalues denoted by Sub1, Sub2, and Sub512.

Mental image visualization device 1B generates three images showing three sub-mental images from the three eigenvectors derived by dimensional compression processor 14B. Note that the images may be generated by operation on mental image visualization system 100B or by a predetermined algorithm. FIG. 15 illustrates three images Sub1, Sub2, and Sub512 showing three sub-mental images generated by mental image visualization device 1B. Note that images Sub1, Sub2, and Sub512 are color images similarly to the sample image in grayscale shown in FIG. 3A, but are shown by lines for convenience.

Figure 16B:
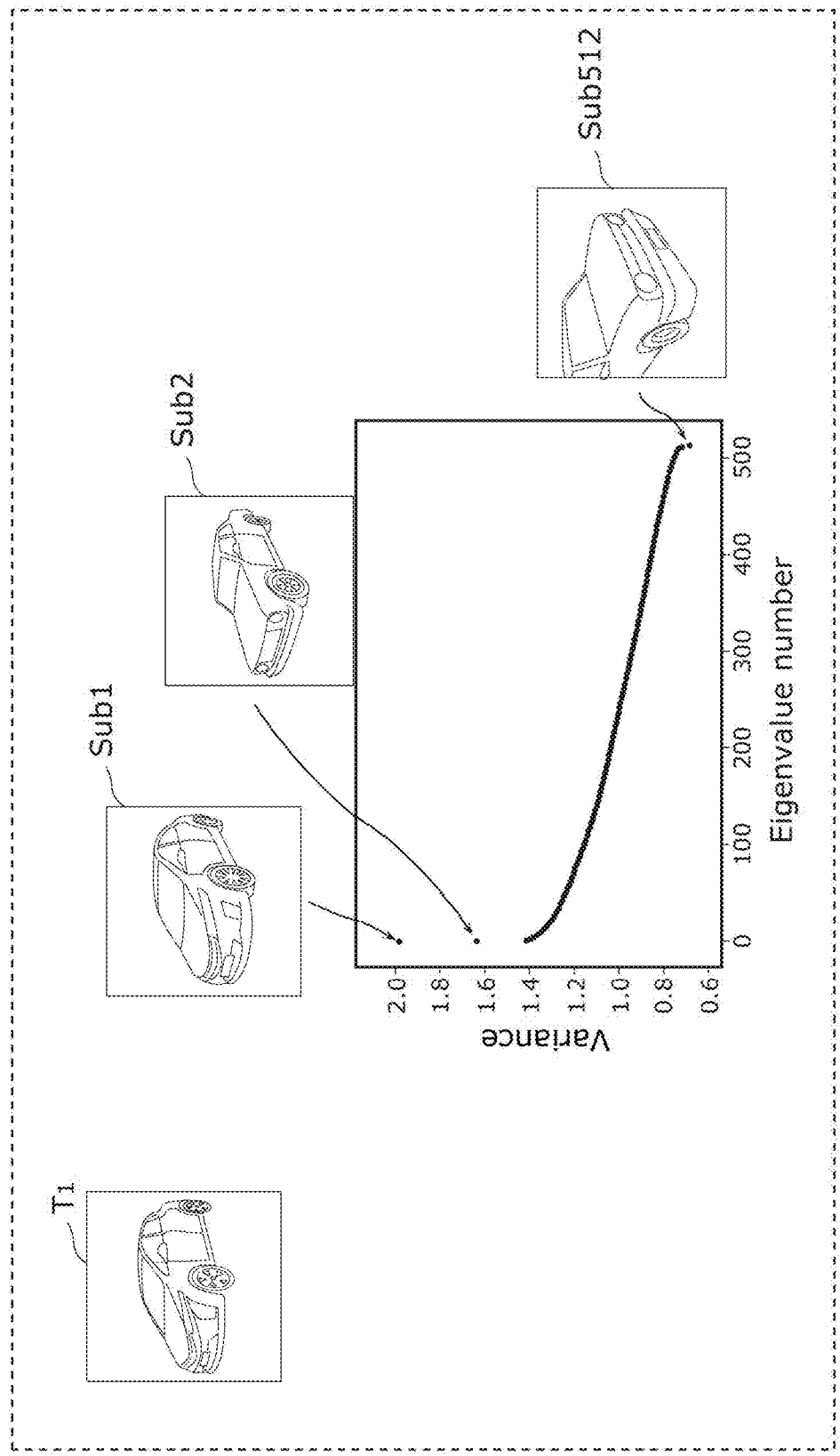
FIG. 16B is a diagram for describing a relation between an image showing a mental image and images showing sub-mental images, using the table illustrated in FIG. 16A.

FIG. 16B is a diagram for describing a relation between an image showing a mental image and images showing sub-mental images, using the table illustrated in FIG. 16A. Image Ti showing a mental image is also a color image similarly to the sample image in grayscale shown in FIG. 3A, but is shown by lines for convenience to facilitate comparison on the drawing.

As can be seen from FIG. 16B, the appearance, for instance, of the automobile shown in image Sub1 showing a sub-mental image and generated from the eigenvector having the greatest eigenvalue is close to the appearance, for instance, of the automobile shown in image Ti showing the mental image. Thus, the sub-mental image generated from the eigenvector having the greatest eigenvalue highly contributes to forming the mental image, and can be considered to be close to preference (a mental image) of a subject. On the other hand, it can be seen that image Sub512 showing a sub-mental image and generated from the eigenvector having the smallest eigenvalue is far from image Ti showing the mental image. Thus, the sub-mental image generated from the eigenvector having the smallest eigenvalue lowly contributes to forming the mental image, and can be considered not to match an ideal (a mental image) of a subject. However, the inventors found that, including mental images with regard to favorable and unfavorable appearances of automobiles, a mental image of a subject includes not only an ideal of the subject, but also a component that is not ideal to the subject. Thus, the inventors found that a mental image also has a suppressive component that is different from an ideal (preference) of the subject.

3. Advantageous Effects and Others

As described above, according to this variation, from at least two eigenvectors obtained from multidimensional feature vectors of sample images output by mental image visualization device 1B, images showing sub-mental images resulting from decomposing components of a mental image can be generated and visualized.

Note that mental image visualization system 100B according to Variation 1 described above does not necessarily include DCNN 13. Instead of DCNN 13, a subject may conduct sensory evaluation on sample images generated by mental image visualization system 100B by psychological reverse correlation, and results of the evaluation may be input to dimensional compression processor 14B.

[Variation 2]

In Variation 1 described above, the case where dimensional compression is performed by STC analysis has been described, yet dimensional compression may be performed using a different technique. Dimensional compression may be performed with the application of dynamic mode decomposition (DMD). The following mainly describes different points from Variation 1.

1-1. Dimensional Compression Processor 14C

Figure 17:
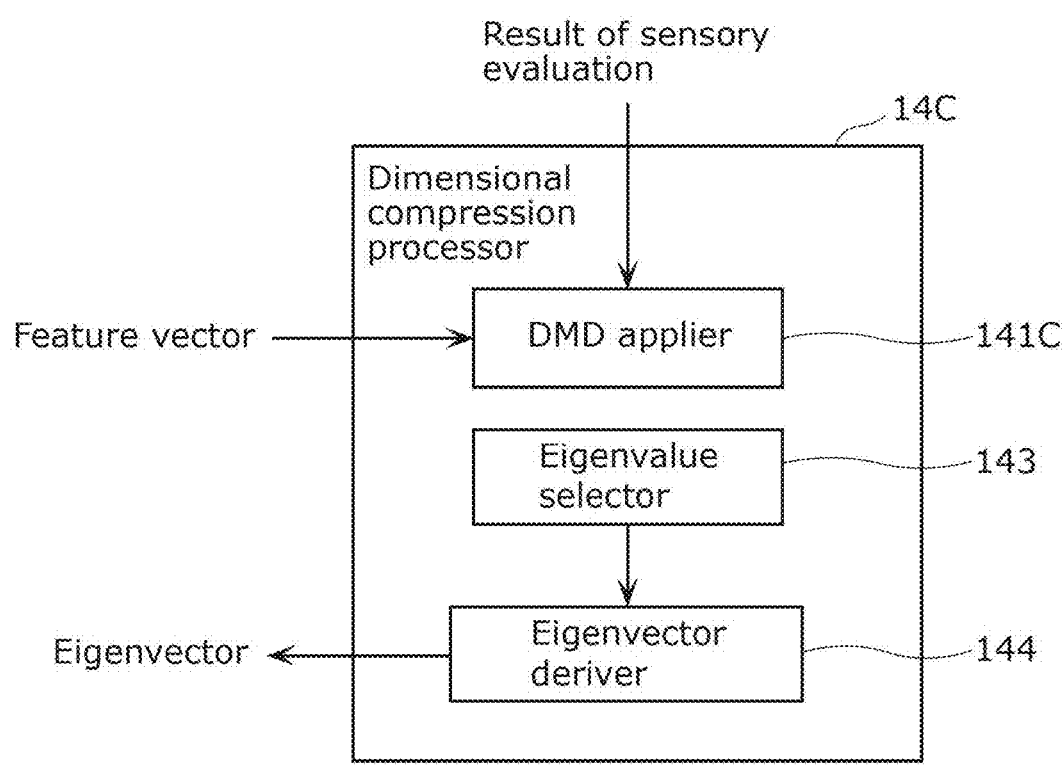
FIG. 17 is a block diagram illustrating an example of a detailed configuration of a dimensional compression processor according to Variation 2 of Embodiment 2.

FIG. 17 is a block diagram illustrating an example of a detailed configuration of dimensional compression processor 14C according to Variation 2 of Embodiment 2. Note that the same elements as those in FIG. 14 are given the same numerals, and a detailed description thereof is omitted.

Dimensional compression processor 14C calculates feature vectors obtained by weighting feature vectors of sample images output from mental image visualization device 1B, according to results obtained by DCNN 13 conducting sensory evaluation on sample images by psychological reverse correlation. Dimensional compression processor 14B outputs eigenvectors obtained by performing dimensional compression by applying DMD to the weighted feature vectors.

In this variation, dimensional compression processor 14C includes DMD applier 141C, eigenvalue selector 143, and eigenvector deriver 144, as illustrated in FIG. 17.

DMD applier 141C obtains eigenvalues by applying DMD to feature vectors obtained by weighting feature vectors of sample images, according to results of sensory evaluation on the sample images by psychological reverse correlation.

Note that when dimensional compression is performed by STC analysis, obtained eigenvectors are on condition of independence, that is, orthogonality. This orthogonality may be a strong restriction. In view of this, eigenvectors that are not on condition of orthogonality can be obtained by applying DMD. With DMD, linearity can be given without considering orthogonality by using a certain linear operator such as the Koopman operator, for example. The same as dimensional compression by STC analysis applies to the other points. Thus, by applying DMD, eigenvalues can be obtained by calculating vectors provided with linearity without considering orthogonality from the weighted feature vectors. Accordingly, similarly to dimensional compression by STC analysis, sub-mental images can be obtained also in the case where dimensional compression is performed with the application of DMD.

1-2. Mental Image Visualization Device 1B

Also in this variation, inputter 12 inputs at least two eigenvectors obtained from dimensional compression processor 14C to DNN 10, similarly to Variation 1 above.

Inputter 12 inputs each of the at least two eigenvectors to DNN 10. DNN 10 generates at least two images showing at least two sub-mental images from the input at least two eigenvectors. Here, when DNN 10 includes a styleGAN, inputter 12 inputs each of the at least two eigenvectors to the generator of the styleGAN. The generator of the styleGAN generates at least two images showing at least two sub-mental images that form a mental image and are not on condition of mutual orthogonality.

Note that an image showing an approximate mental image is generated also by inputting, to DNN 10, a vector resulting from adding eigenvectors each having one of eigenvalues obtained by dimensional compression processor 14C.

2. Example of Operation of Mental Image Visualization System 100B

In this variation, variance-covariance matrix 141a and eigenvector analysis 142a that are illustrated in FIG. 15 operate while DMD is being applied instead of STC analysis. The other operation is the same as Variation 1, and thus a description thereof is omitted.

Note that mental image visualization system 100B according to this variation does not necessarily include DCNN 13. Instead of DCNN 13, a subject may conduct sensory evaluation on sample images generated by mental image visualization system 100B by psychological reverse correlation, and results of the evaluation may be input to dimensional compression processor 14C.

Embodiment 3

Next, recommendation system 200 that uses mental images is to be described, as an example of application in which mental images that can be generated in Embodiments 1 and 2 are used. Note that sub-mental images described in Variations 1 and 2 of Embodiment 2 may be used instead of mental images.

1. Recommendation System 200

Figure 18:
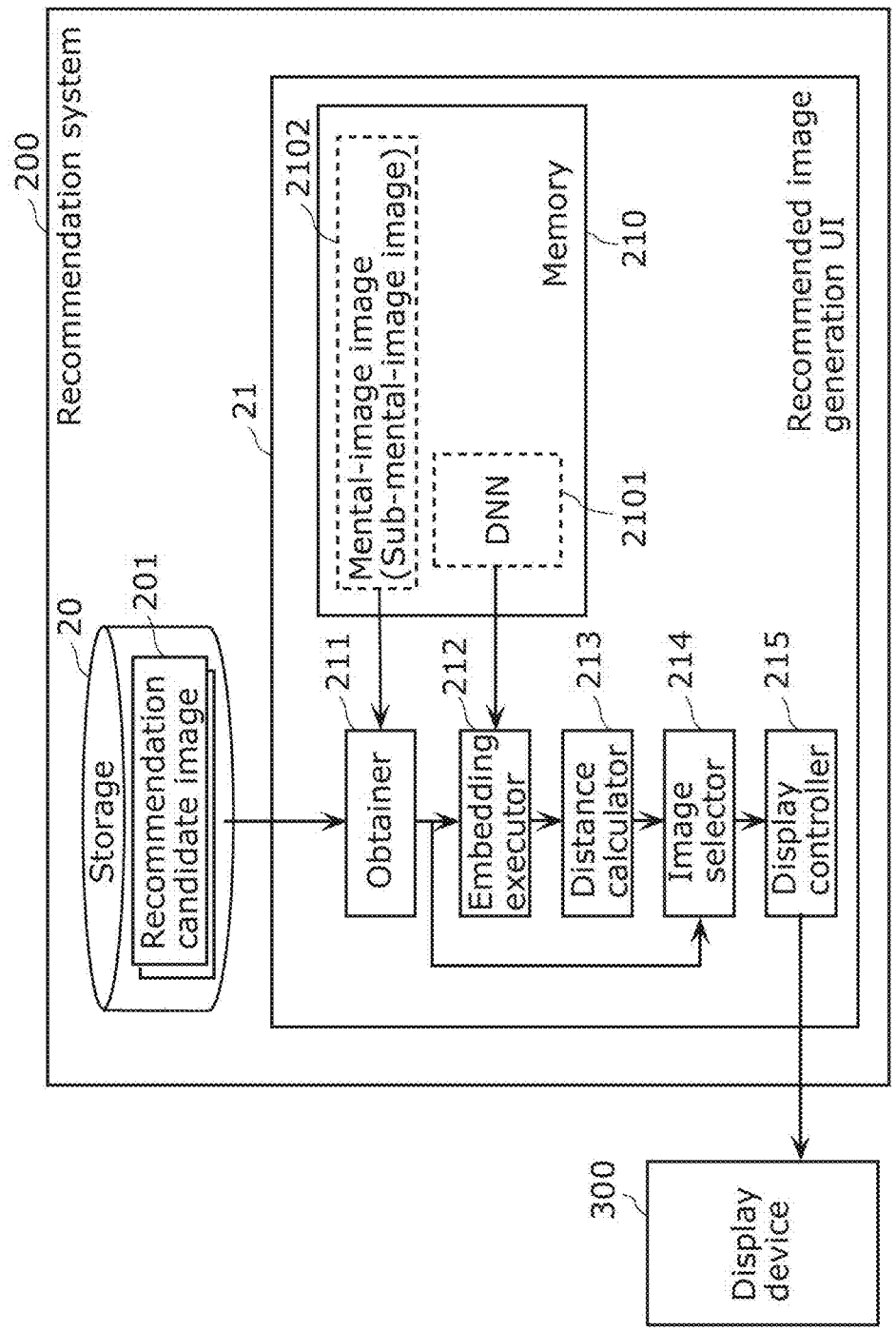
FIG. 18 is a block diagram illustrating an example of a configuration of a recommendation system according to Embodiment 3.
Figure 19:
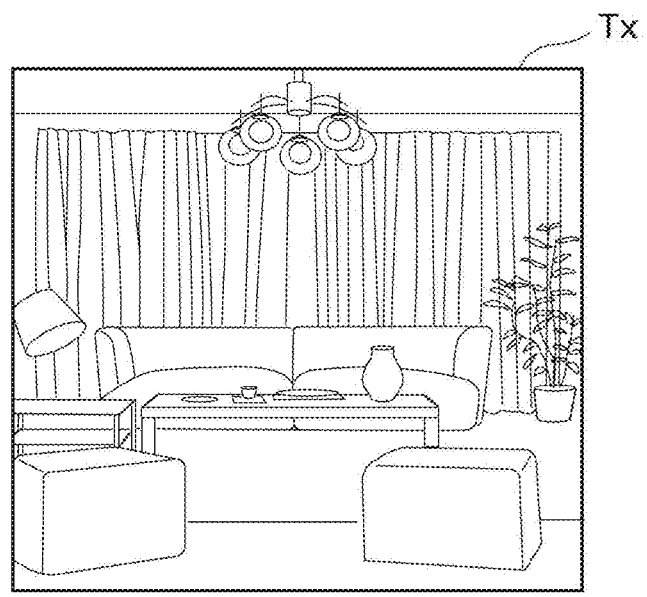
FIG. 19 illustrates an example of a mental image or a sub-mental image according to Embodiment 3.
Figure 20:
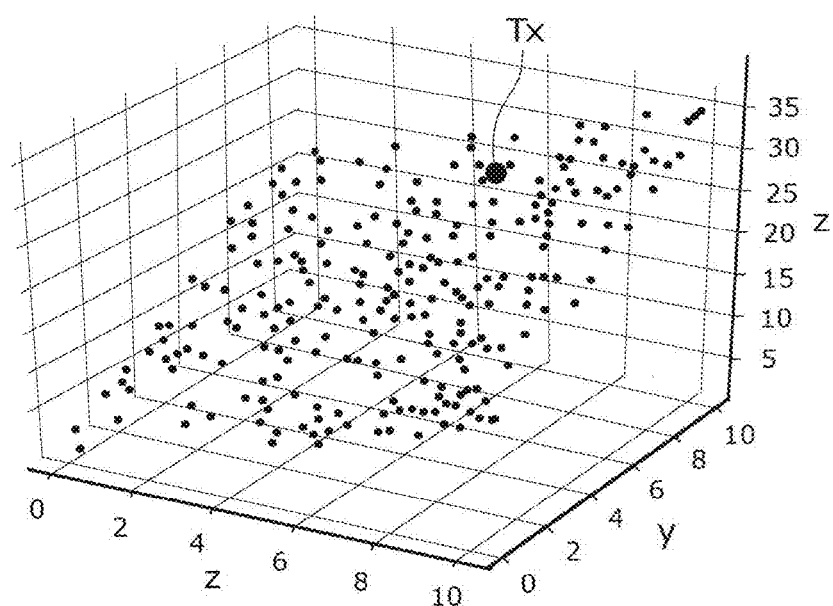
FIG. 20 illustrates an example of a latent space and a position of a mental or sub-mental image according to Embodiment 3.

FIG. 18 is a block diagram illustrating an example of a configuration of recommendation system 200 according to Embodiment 3. The functions of recommendation system 200 are achieved by software using computer 1000 illustrated in FIG. 4. FIG. 19 illustrates an example of a mental image or a sub-mental image according to Embodiment 3. Note that the example of a mental image or a sub-mental image illustrated in FIG. 19 is shown as a line drawing for convenience, although it is originally a color image. FIG. 20 illustrates an example of a latent space and a position of a mental or sub-mental image according to Embodiment 3.

In the present embodiment, recommendation system 200 includes storage 20 and recommended image generation user interface (UI) 21. The following describes details of the elements.

1-1. Storage 20

Storage 20 includes a hard disk drive (HDD) or a memory, for instance, and stores therein recommendation candidate images 201, for instance. Recommendation candidate images 201 are included in a group of images of tens to hundreds of existing products, for example, such as images of goods, and the group includes images of product candidates to be recommended to a subject (a user). Note that the number of images in the group is an example, and the group may include more than hundreds of images.

The present embodiment describes an example in which recommendation candidate images 201 are included in a group of images of existing products that relate to interior decoration (interior products).

1-2. Recommended Image Generation UI 21

Recommended image generation UI 21 presents, to a subject, recommendation candidate image 201 showing an existing product close to a mental image that the subject has, out of recommendation candidate images 201 stored in storage 20. For example, recommended image generation UI 21 presents, to a subject, recommendation candidate image 201 showing an interior product close to a mental image (preference) that the subject has, out of recommendation candidate images 201 each showing an interior product and stored in storage 20.

As illustrated in FIG. 18, recommended image generation UI 21 includes memory 210, obtainer 211, embedding executor 212, distance calculator 213, image selector 214, and display controller 215.

Memory 210 stores DNN 2101 and mental-image image (sub-mental-image image) 2102.

DNN 2101 may be a copy of DNN 10 obtained from mental image visualization system 100 (100B) illustrated in FIG. 7 (FIG. 13), or may be a trained styleGAN described in Embodiments 1 and 2. DNN 2101 may be stored in memory 210 in any form, as long as the latent space of the trained styleGAN in DNN 10 can be used. In the present embodiment, the styleGAN is pre-trained using a data set that includes existing interior images, for example.

Mental-image image (sub-mental-image image) 2102 is generated by mental image visualization system 100 (100B) illustrated in FIG. 7 (FIG. 13), for example, and is obtained and stored in memory 210 in advance. In the present embodiment, mental-image image (sub-mental-image image) 2102 obtained and stored in memory 210 in advance is image Tx showing interior products illustrated in FIG. 19, for example.

Obtainer 211 obtains recommendation candidate images 201 from storage 20, and outputs the images to embedding executor 212. Further, obtainer 211 obtains mental-image image (sub-mental-image image) 2102 from memory 210, and outputs the image to embedding executor 212.

Note that obtainer 211 obtains and stores the latent space of DNN 10 into memory 210 in advance. In the present embodiment, obtainer 211 obtains a copy of DNN 10 in advance from mental image visualization system 100B (100), to obtain the latent space of DNN 10. For example, obtainer 211 obtains the latent space of the styleGAN in which dots (vector positions) as illustrated in FIG. 20 are distributed.

Embedding executor 212 embeds mental-image image (sub-mental-image image) 2102 obtained from obtainer 211 in the latent space of DNN 2101 and obtains the position (vector position) of mental-image image (sub-mental-image image) 2102, in advance. In the present embodiment, embedding executor 212 embeds image Tx showing interior products as illustrated in FIG. 19 in the latent space of DNN 2101, for example, and obtains the position (vector position) of image Tx as illustrated in FIG. 20, for example. Image Tx showing interior products as illustrated in FIG. 19 is an example of mental-image image (sub-mental-image image) 2102, as described above.

Embedding executor 212 embeds each of recommendation candidate images 201 obtained by obtainer 211 in the latent space of DNN 2101, and obtains the positions (vector positions) of recommendation candidate images 201 in the latent space.

Distance calculator 213 calculates distances each between the position (vector position) of a mental image in the latent space of DNN 2101 and one of the positions (vector positions) of embedded recommendation candidate images 201.

Figure 21:
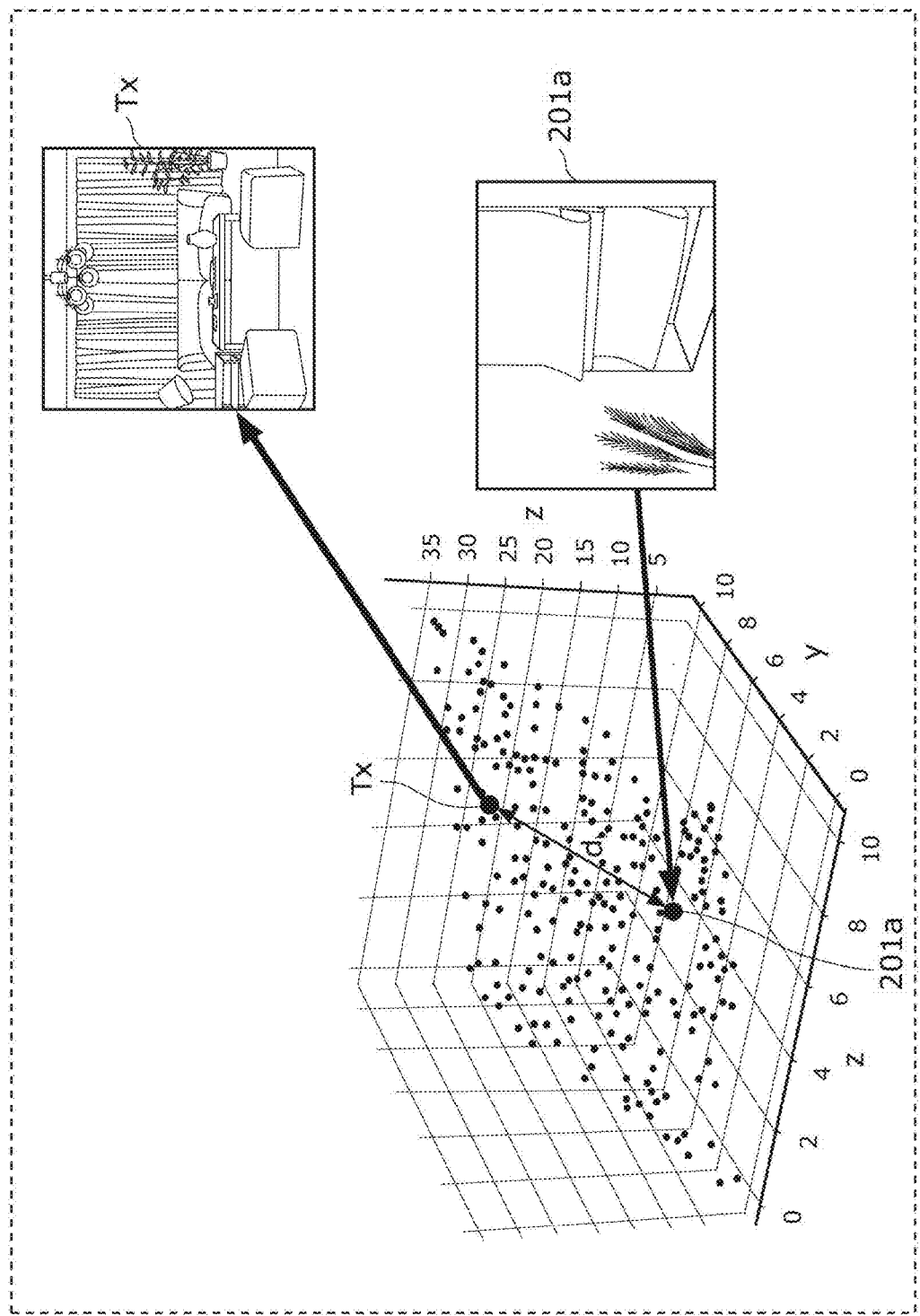
FIG. 21 illustrates an example of a distance between a position of a mental image or a sub-mental image and a position of one recommendation candidate image in a latent space according to Embodiment 3.

FIG. 21 illustrates an example of a distance between a position of a mental image or a sub-mental image and a position of one recommendation candidate image 201a in the latent space according to Embodiment 3. FIG. 21 illustrates a position of image Tx showing interior products as illustrated in FIG. 19 in the latent space illustrated in FIG. 20 and a position of one recommendation candidate image 201a in the latent space illustrated in FIG. 20. Note that one recommendation candidate image 201a is shown as an image of a curtain as an example of an interior product.

In the present embodiment, distance calculator 213 calculates, for example, distance d between the position of image Tx showing interior products as illustrated in FIG. 19 and the position of one recommendation candidate image 201a in the latent space illustrated in FIG. 21. Similarly, distance calculator 213 calculates, for example, distances each between the position of image Tx showing interior products as illustrated in FIG. 19 and one of the positions of recommendation candidate images 201 in the latent space illustrated in FIG. 21.

Image selector 214 selects one or more recommendation candidate images 201 each at a distance of at most a threshold, out of the distances calculated by distance calculator 213, from among recommendation candidate images 201 obtained by obtainer 211.

In the present embodiment, image selector 214 selects one or more interior products that are close to the interior products shown in image Tx illustrated in FIG. 19, which is mental-image image (sub-mental-image image) 2102 of a subject, using the distances calculated by distance calculator 213.

Display controller 215 presents, to the subject having mental-image image (sub-mental-image image) 2102, one or more recommendation candidate images 201 selected by image selector 214. Thus, display controller 215 controls display device 300 and causes display device 300 to display an image showing a recommended product, thus presenting the recommended product to the subject.

Figure 22C:
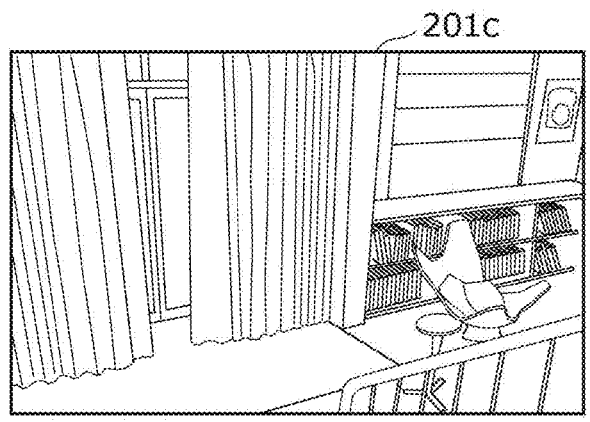
FIG. 22C illustrates an example of a recommendation candidate image presented by the recommended image generation UI according to Embodiment 3.

In the present embodiment, display controller 215 presents, to the subject, recommendation candidate images 201 illustrated in FIG. 22A to FIG. 22C, for example, selected by image selector 214, by causing display device 300 to display the images.

Here, FIG. 22A to FIG. 22C each illustrate an example of a recommendation candidate image presented by recommended image generation UI 21 according to Embodiment 3. FIG. 22A to FIG. 22C each illustrate an example of recommendation candidate image 201 presented by recommended image generation UI 21 and an example of descriptive text thereof according to Embodiment 3. Note that recommendation candidate images 201a, 201b, and 201c illustrated in FIG. 22A to FIG. 22C, respectively, are illustrated as line drawings for convenience, although the images are originally color images. FIG. 22A, FIG. 22B, and FIG. 22C illustrate recommendation candidate images 201a, 201b, and 201c that are images of curtains as examples of interior products, and also descriptive text thereof.

1-3. Display Device 300

Display device 300 includes a display on which images and text are displayed. Here, examples of the display include a liquid crystal display, a plasma display, and an organic electro-luminescent (EL) display. Display device 300 has functions as a UI that receives input operation by a subject, and includes at least one of a keyboard, a mouse, a touch sensor, or a touch pad, for example.

2. Example of Method for Obtaining Mental-Image Image (Sub-Mental-Image Image) 2102

A description has been given, stating that recommendation system 200 according to the present embodiment obtains in advance from mental image visualization system 100 (100B) illustrated in FIG. 7 (FIG. 13) and stores in memory 210 mental-image image (sub-mental-image image) 2102, for example.

Recommendation system 200 may passively obtain mental-image image (sub-mental-image image) 2102 from mental image visualization system 100 (100B) illustrated in FIG. 7 (FIG. 13), but the present embodiment is not limited thereto.

Recommendation system 200 may actively obtain mental-image image (sub-mental-image image) 2102 in corporation with mental image visualization system 100 (100B) illustrated in FIG. 7 (FIG. 13). Thus, recommendation system 200 may cause mental image visualization system 100 (100B) illustrated in FIG. 7 (FIG. 13) to generate mental-image image (sub-mental-image image) 2102, through interaction with a subject via display device 300.

The following describes an example of a method for obtaining mental-image image (sub-mental-image image) 2102 in this case.

Figure 23A:
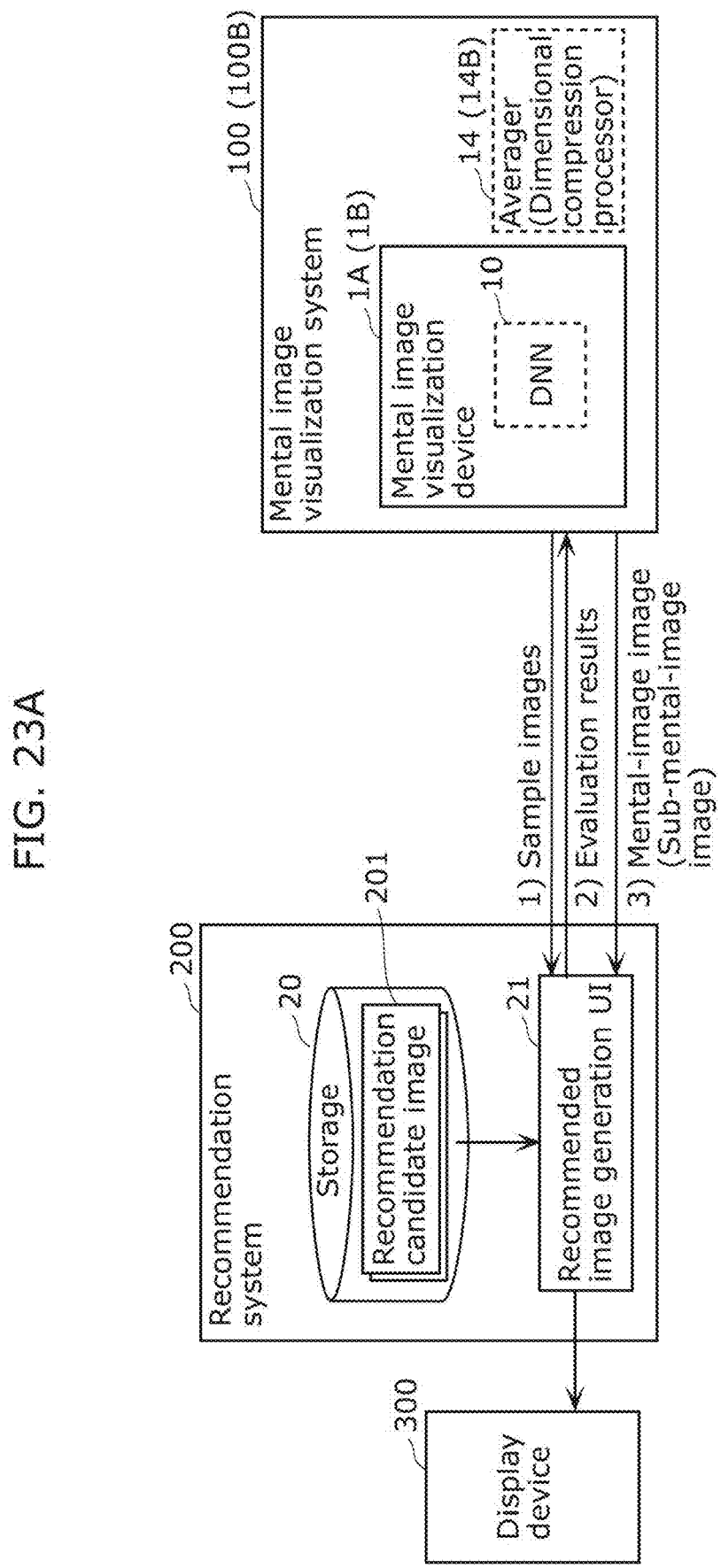
FIG. 23A illustrates an example of a method for the recommendation system to obtain a mental image or a sub-mental image according to Embodiment 3.
Figure 23B:
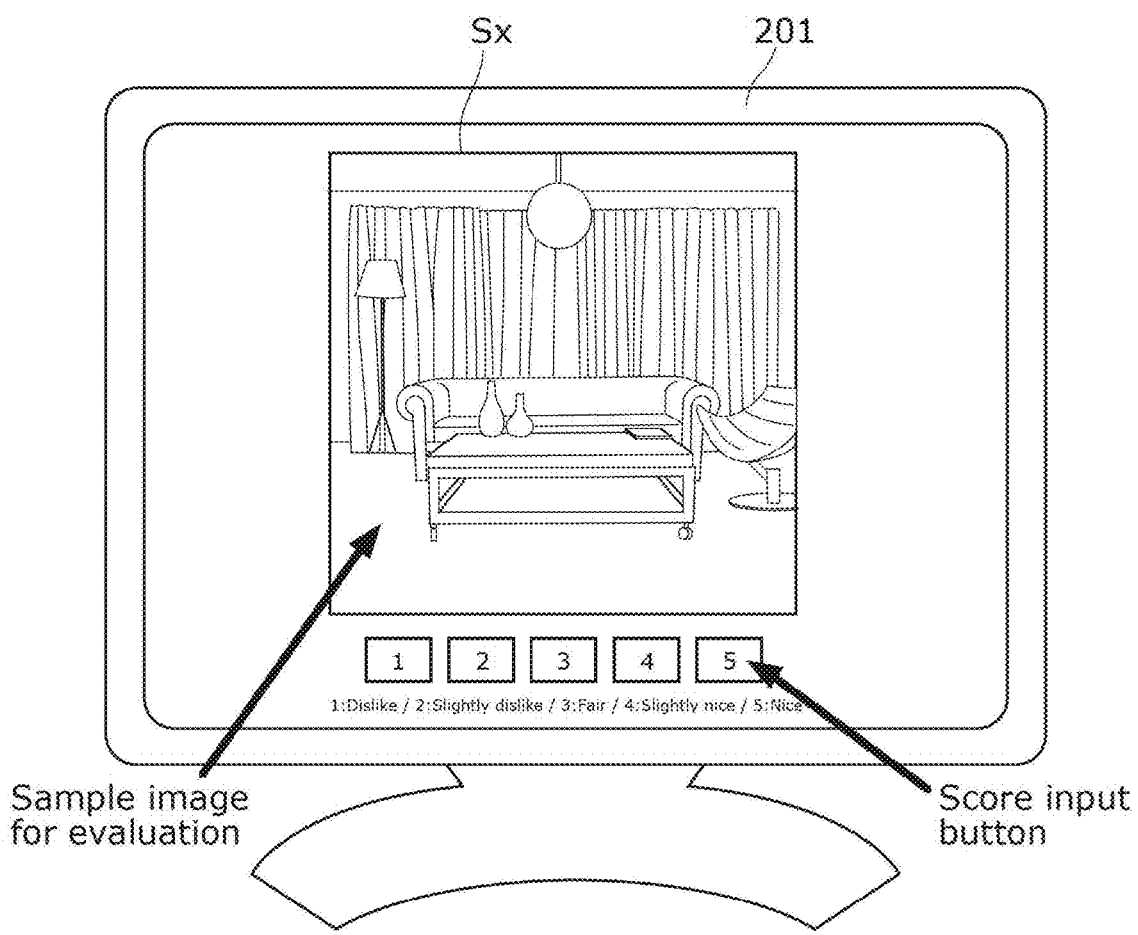
FIG. 23B illustrates an example of a presented sample image evaluated by a subject and an example of an evaluation method according to Embodiment 3.

FIG. 23A illustrates an example of a method for recommendation system 200 to obtain a mental image or a sub-mental image according to Embodiment 3. FIG. 23B illustrates an example of a presented sample image evaluated by a subject and an example of an evaluation method according to Embodiment 3. The same elements as those in FIG. 18, for instance, are given the same numerals, and a detailed description thereof is omitted.

As illustrated in FIG. 23A, recommendation system 200 first obtains sample images that relate to interior products, which have been generated by mental image visualization system 100 100B). For example, recommendation system 200 obtains about ten sample images.

Next, recommendation system 200 causes display device 300 to sequentially display the obtained sample images, and requests a subject to conduct sensory evaluation by psychological reverse correlation to input how much the subject prefers an interior product shown in the displayed sample image. FIG. 23B illustrates image Sx of total interior decoration that includes a sofa, a table, and curtains, for instance, as an example of a sample image for evaluation, and score input buttons for a subject to input how much preference the subject has.

Next, when recommendation system 200 obtains scores for sample images that include image Sx, which are input by the subject, recommendation system 200 inputs the scores to mental image visualization system 100 (100B) as the results of sensory evaluation by psychological reverse correlation.

Then, mental image visualization system 100 (100B) generates a mental image (sub-mental image) from the scores that are the results of sensory evaluation by psychological reverse correlation and feature vectors of the sample images output by mental image visualization device 1A. Details of the generation methods have been described in Embodiments 1 and 2, and thus a description thereof is omitted here.

Next, recommendation system 200 obtains the mental-image image (sub-mental-image image) generated by mental-image image visualization system 100 (100B), and stores the image as mental-image image (sub-mental-image image) 2102 into memory 210.

Accordingly, recommendation system 200 can obtain images showing mental images (sub-mental images) that unspecific subjects have from mental image visualization system 100 (100B), using about ten sample images.

3. Advantageous Effects and Others

As described above, according to the present embodiment, recommendation system 200 can recommend an existing product close to a mental image (sub-mental image), using an image showing a mental image (sub-mental image) that a subject has. Thus, by using an image showing a mental image (sub-mental image) that a subject has, even in a state in which behavior history information of a subject such as a purchase history that a conventional recommendation engine requires is not provided, an existing product that suits the preference of the subject can be selected and recommended.

Further, recommendation system 200 can obtain images showing mental images (sub-mental images) that unspecific subjects have, by cooperating with mental image visualization system 100 (100B). By using images showing mental images (sub-mental images) that unspecific subjects have, even in a state in which behavior history information of a subject such as a purchase history that a conventional recommendation engine requires is not provided, an existing product that suits the preference of the subject can be selected and recommended. Accordingly, also for an unspecific subject who visits an electronic commerce (EC) website, even in a state in which behavior history information of the subject such as a purchase history is not provided, an existing product that suits preference of the subject can be selected and recommended.

Note that recommendation system 200 has been described as a system different from mental image visualization system 100 (100B), but the present disclosure is not limited thereto. Recommendation system 200 may include therein mental image visualization system 100 (100B).

Possibility of Other Embodiments

The above has described the mental image visualization method, the recommendation method, and others according to aspects of the present disclosure based on the embodiments, yet the present disclosure is not limited to these embodiments.

The scope of the present disclosure also encompasses embodiments as a result of applying, to the embodiments, various modifications that may be conceived by those skilled in the art, and embodiments obtained by combining elements in different embodiments, as long as the resultant embodiments do not depart from the spirit of the present disclosure. For example, the cases as below are also encompassed within the present disclosure.

(1) Specifically, some or all of the elements included in the mental image visualization device, the mental image visualization system, and the recommendation system described above may be a computer system that includes a microprocessor, read only memory (ROM), RAM, a hard disk unit, a display unit, a keyboard, and a mouse, for instance. A computer program is stored in the RAM or the hard disk unit. The operation of the microprocessor in accordance with the computer program allows each device to achieve its functionality. Here, the computer program includes a combination of command codes indicating instructions to a computer in order to achieve given functionality.

(2) Some or all of the elements included in the mental image visualization device, the mental image visualization system, and the recommendation system described above may include a single system large scale integration (LSI: large scale integrated circuit). The system LSI is a super multi-functional LSI manufactured by integrating multiple components in one chip, and is specifically a computer system configured so as to include a microprocessor, ROM, and RAM, for instance. A computer program is stored in the RAM. The system LSI accomplishes its functionality by the microprocessor operating in accordance with the computer program.

(3) Some or all of the elements included in the mental image visualization device, the mental image visualization system, and the recommendation system described above may be included in an IC card or a single module that can be attached to or detached from the devices. The IC card or the module is a computer system that includes a microprocessor, ROM, and RAM, for instance. The above super-multifunctional LSI may be included in the IC card or the module. The IC card or the module accomplishes its functionality by the microprocessor operating in accordance with the computer program. This IC card or module may have tamper resistant properties.

(4) Some or all of the elements included in the mental image visualization device, the mental image visualization system, and the recommendation system described above may be achieved, being distributed as a network structure that includes a server and a cloud storage. A data input device and an arithmetic unit can be present separately in remote locations, and input devices and arithmetic units may be present, being distributed.

INDUSTRIAL APPLICABILITY

The present disclosure is applicable to a mental image visualization method, a mental image visualization device, and a recording medium, and in particular is applicable to a mental image visualization method, a mental image visualization device, and a recording medium for visualizing mental images of subjects individually or as a group, for instance.

The invention claimed is:

1. A mental image visualization method comprising:
   generating, by a deep neural network (DNN) trained using a data set of feature training images for feature learning, sample images in which different objects in a category same as a category of objects captured in the feature training images are captured;
   inputting the sample images to the DNN;
   obtaining feature vectors of the sample images from the DNN, the feature vectors each resulting from one of the sample images being converted by the DNN into an n-dimensional vector, where n is an integer greater than or equal to 100, and the feature vectors are used to generate an image showing a mental image;
   obtaining eigenvalues by applying dynamic mode decomposition (DMD) to feature vectors obtained by weighting the feature vectors of the sample images, according to results of sensory evaluation on the sample images by psychological reverse correlation;
   selecting at least two eigenvalues from among the eigenvalues and obtaining at least two eigenvectors each having one of the at least two eigenvalues; and
   generating, using the DNN, at least two images showing at least two sub-mental images from the at least two eigenvectors, the at least two sub-mental images forming the mental image and being not on condition of mutual orthogonality.

2. The mental image visualization method according to claim 1, further comprising:
   obtaining a first feature vector by calculating a weighted average of the feature vectors of the sample images, according to results of sensory evaluation on the sample images by psychological reverse correlation; and
   generating, using the DNN, the image showing the mental image from the first feature vector.

3. The mental image visualization method according to claim 2,
   wherein the DNN includes a style-based generator architecture for generative adversarial networks (styleGAN),
   in the obtaining of the feature vectors, the feature vectors are obtained by obtaining outputs from a mapping network of the styleGAN, and
   in the generating of the image showing the mental image, a synthesis network of the styleGAN generates the image showing the mental image, in response to the first feature vector being input to the synthesis network.

4. The mental image visualization method according to claim 2, further comprising:
   obtaining the results of the sensory evaluation on the sample images by the psychological reverse correlation, by (i) inputting the sample images to a deep convolution neural network (DCNN) trained using a training data set, and (ii) the DCNN predicting the results of the sensory evaluation on the sample images, the training data set including images provided using the psychological reverse correlation and results of the sensory evaluation on the images conducted by a subject having the mental image.

5. The mental image visualization method according to claim 4,
   wherein the DCNN includes:
      a convolution neural network (CNN) pre-trained;
      one or more convolution layers provided downstream of the CNN; and
      a global average pooling (GAP) layer provided downstream of the one or more convolution layers, and
   the CNN includes convolution layers and pooling layers.

6. A non-transitory computer-readable recording medium having recorded thereon a program for executing a mental image visualization method that includes:
   generating, by a deep neural network (DNN) trained using a data set of feature training images for feature learning, sample images in which different objects in a category same as a category of objects captured in the feature training images are captured;
   inputting the sample images to the DNN;
   obtaining feature vectors of the sample images from the DNN, the feature vectors each resulting from one of the sample images being converted by the DNN into an n-dimensional vector, where n is an integer greater than or equal to 100, and the feature vectors are used to generate an image showing a mental image;
   obtaining eigenvalues by applying dynamic mode decomposition (DMD) to feature vectors obtained by weighting the feature vectors of the sample images, according to results of sensory evaluation on the sample images by psychological reverse correlation;
   selecting at least two eigenvalues from among the eigenvalues and obtaining at least two eigenvectors each having one of the at least two eigenvalues; and
   generating, using the DNN, at least two images showing at least two sub-mental images from the at least two eigenvectors, the at least two sub-mental images forming the mental image and being not on condition of mutual orthogonality.

7. A mental image visualization device comprising:
   a deep neural network (DNN) trained using a data set of feature training images for feature learning; an obtainer that obtains sample images generated by the DNN, the sample images being images in which different objects in a category same as a category of objects captured in the feature training images are captured; and an inputter that inputs the sample images to the DNN, wherein the obtainer obtains feature vectors of the sample images from the DNN, the feature vectors each resulting from one of the sample images being converted by the DNN into an n-dimensional vector, where n is an integer greater than or equal to 100, and the feature vectors are used to generate an image showing a mental image, wherein eigenvalues are obtained by applying dynamic mode decomposition (DMD) to feature vectors obtained by weighting the feature vectors of the sample images, according to results of sensory evaluation on the sample images by psychological reverse correlation, wherein at least two eigenvalues are selected from among the eigenvalues and at least two eigenvectors are obtained each having one of the at least two eigenvalues, and wherein at least two images are generated, using the DNN, showing at least two sub-mental images from the at least two eigenvectors, the at least two sub-mental images forming the mental image and being not on condition of mutual orthogonality.

* * * * *